US006481013B1

(12) United States Patent
Dinwiddie et al.

(10) Patent No.: US 6,481,013 B1
(45) Date of Patent: Nov. 12, 2002

(54) ENTERTAINMENT AND COMPUTER COAXIAL NETWORK AND METHOD OF DISTRIBUTING SIGNALS THERETHROUGH

(75) Inventors: John M. Dinwiddie; William Burrell Nunnery; Jack S. Chorpenning, all of Cary, NC (US)

(73) Assignee: Peracom Networks, Inc., Cary, NC (US)

( * ) Notice: Subject to any disclaimer, the term of this patent is extended or adjusted under 35 U.S.C. 154(b) by 0 days.

(21) Appl. No.: 09/251,315

(22) Filed: Feb. 17, 1999

Related U.S. Application Data

(60) Provisional application No. 60/107,681, filed on Nov. 9, 1998.

(51) Int. Cl.[7] .......................... H04N 7/173; H04N 7/18

(52) U.S. Cl. .......................... 725/80; 725/74; 725/141; 725/153; 348/552

(58) Field of Search .......................... 348/6, 8, 12, 13, 348/14, 552; 455/3.1, 4.2, 5.1, 6.1, 6.2, 6.3; 725/74–85, 131–134, 139–142, 151–153

(56) References Cited

U.S. PATENT DOCUMENTS

| | | | | | |
|---|---|---|---|---|---|
| 3,668,307 | A | * | 6/1972 | Face et al. | 725/119 |
| 3,673,517 | A | | 6/1972 | Ticknor | |
| 4,367,548 | A | | 1/1983 | Cotten et al. | |
| 4,394,691 | A | | 7/1983 | Amano et al. | |
| 4,420,841 | A | | 12/1983 | Dudash | |
| 4,509,211 | A | | 4/1985 | Robbins | |
| 4,606,072 | A | | 8/1986 | Martin et al. | |
| 4,677,686 | A | | 6/1987 | Hustig et al. | |
| 4,710,917 | A | * | 12/1987 | Tompkins et al. | 348/14.08 |
| 4,907,079 | A | | 3/1990 | Turner et al. | |
| 5,027,426 | A | * | 6/1991 | Chiocca | 455/5 |
| 5,216,499 | A | | 6/1993 | Berkheimer | |
| 5,227,780 | A | | 7/1993 | Tigwell | |
| 5,255,267 | A | * | 10/1993 | Hansen et al. | 370/85.1 |
| 5,343,240 | A | * | 8/1994 | Yu | 348/14 |
| 5,384,603 | A | | 1/1995 | Strauss et al. | |
| 5,410,720 | A | | 4/1995 | Osterman | |
| 5,440,335 | A | | 8/1995 | Beveridge | |
| 5,467,384 | A | | 11/1995 | Skinner | |
| 5,485,630 | A | * | 1/1996 | Lee et al. | 455/4.1 |
| 5,499,047 | A | | 3/1996 | Terry et al. | |
| 5,512,963 | A | | 4/1996 | Mankovitz | |
| 5,539,880 | A | | 7/1996 | Lakhani | |
| 5,583,931 | A | | 12/1996 | Schneider | |
| 5,585,837 | A | | 12/1996 | Nixon | |
| 5,592,482 | A | | 1/1997 | Abraham | |
| 5,623,542 | A | | 4/1997 | Schneider et al. | |
| 5,642,155 | A | * | 6/1997 | Cheng | 348/12 |
| 5,663,682 | A | | 9/1997 | Meline et al. | |
| 5,675,390 | A | | 10/1997 | Schindler et al. | |
| 5,722,041 | A | | 2/1998 | Freadman | |
| 5,760,822 | A | * | 6/1998 | Coutinho | 348/121 |
| 5,805,806 | A | * | 9/1998 | McArthur | 709/218 |
| 5,886,732 | A | * | 3/1999 | Humpleman | 348/10 |
| 6,014,386 | A | * | 1/2000 | Abraham | 370/485 |

FOREIGN PATENT DOCUMENTS

| | | |
|---|---|---|
| JP | 133153/1980 | 4/1979 |

* cited by examiner

*Primary Examiner*—Andrew Faile
*Assistant Examiner*—Reuben M. Brown
(74) *Attorney, Agent, or Firm*—A. Jose Cortina; Kilpatrick Stockton

(57) ABSTRACT

Apparatus for distributing radio frequency (RF) modulated broadcast television signals from a broadcast signal source to networked appliances connected to the source through a plurality of single conductor coaxial cables, simultaneously with distributing unmodulated digital signals and RF modulated video signals exchanged between the networked appliances over the same network coaxial cables.

13 Claims, 12 Drawing Sheets

| FIG. 1A | FIG. 1B |
|---|---|

5 MHz High Pass Filter 4.5 MHz Low Pass Filter 2.5 MHz High Pass Filter 2.5 MHz Low Pass Filter

ENTERTAINMENT AND COMPUTER COAXIAL NETWORK AND METHOD OF DISTRIBUTING SIGNALS THERETHROUGH

CROSS REFERENCE TO RELATED APPLICATIONS

This application is related to and claims priority to U.S. Provisional Application Ser. No. 60/107,681, filed Nov. 9, 1998 and entitled "Home Entertainment Network."

TECHNICAL FIELD

This invention relates to signal networks, and more particularly to signal networks for interconnecting multi-media apparatus.

BACKGROUND ART

According to computer industry estimates there are over 40 million homes in the United States with personal computers (PCs), and nearly half of these homes have more than one PC. The forecast is that these numbers will double in five years. Surveys of consumers with multiple PCs indicate that, in terms of priority, they want the PCs to be able to share files, printers, modems and the Internet, followed by the sharing of other peripheral equipment and the playing of network games. These shared applications require minimum signal transfer rates of 1 Mb/s for satisfactory performance.

Similarly, more than 73 million homes nationwide are subscribers to cable television (CATV). The CATV services provide installed coaxial cable in one or more rooms of a house, resulting in the majority of subscribers having more than one television receiver (TV). Additionally, the expansion of CATV services to include internet access (i.e. "data over cable system interface specification" or DOCSIS) and the advent of consumer electronic products for internet use as well as for entertainment purposes, all promote a desire to network this equipment for shared use Networking allows a PC in the home office to print documents on a printer in the family room, a VCR in the family room to be remotely controlled to display video on a kitchen TV, and a wireless computer keyboard used with the family room TV to access work or game files on the PC in the home office. The alternative to networking is product duplication.

There is of course a cost associated with establishing a network. This is the cost of installing the network wiring and the cost of purchasing and installing any interface devices which are necessary to adapt the appliances for network operation. The current CEBus Standard installation guide for home networks specifies installation of a central distribution box ("Service Center") which receives all of the network signals, both internal and external. External signals include radio frequency (RF) broadband signals from CATV, satellite dishes, and antenna received broadcast—collectively "RF broadcast signals", as well as DOCSIS. The internal signals are those from the networked appliances, including digital signals from digital signal apparatus, such as computers, computer peripheral equipment, telephones and facsimile machines, as well as RF modulated video signals produced by RF modulation of audio/video output signals from the networked multimedia A/V equipment.

To accommodate these different network signal forms and to permit bi-directional signal transmission between appliances via the distribution box (i.e. downstream and upstream transmission) the Standard specifies installation of dual coaxial cables and one or more Category 5 twisted pair (TP) copper wires from the Service Center to outlets in each equipment room of the house. Upstream signal transmission includes the RF modulated A/V signals from the network multimedia equipment which the interface devices provide over CATV channel frequencies reserved by the owner for internal use. The downstream coax signals include both RF broadcast signals, control signals, and the home user RF modulated A/V signals. The baseband, digital signal devices, including computers, modems, faxes and digital telephones communicate over the twisted pair. The present estimated cost of installing CEBus Standard network wiring in new home construction is approximately $1 per square foot, and the estimated cost of upgrading existing homes is 2 to 3 times as much.

Alternatively, considering the broad installed base of CATV services and the fact that there are an additional 30 million homes with CATV access, it is desirable to provide for networking of the electronic appliances in a home through the installed CATV cabling. As known, CATV services provide a source signal connection to the home from a "head end", or local node of the service provider's CATV system. Within the house the signals are distributed from this head end connection through coaxial cables, which include a single conductor plus a shield. Signal splitters are used to divide the source CATV signal among the cables thereby providing the source CATV signal with a substantially constant load impedance, while also providing signal isolation between its output ports to prevent signals propagating from the source connection from being cross coupled to the other output ports. The splitter, therefore, prevents the upstream transmission necessary required for network communications, which is the reason for the dual cable requirement of the CEBus Standard.

DISCLOSURE OF INVENTION

One object of the present invention is to provide bi-directional signal transmission over a single conductor coaxial cable. Another object of the present invention is to provide a network capable of conducting simultaneous bi-directional signal transmission of unmodulated digital signals, and radio frequency (RF) modulated signals over a single conductor coaxial cable. Still another object of the present invention is to provide a network capable of providing bi-directional signal transmission of broadband, baseband and infrared signals over a single conductor coaxial cable. Still another object of the present invention is to provide bi-directional transmission of high bandwidth broadband signals over a low bandwidth single conductor coaxial cable.

According to the present invention, a network includes one or more single conductor coaxial cables routed within proximity to one or more local groups of networked appliances, interface apparatus associated with each networked appliance which use frequency division to separate the computer and media signals from the local group appliances onto baseband and broadband signal frequency channels within a local coaxial cable which couples the signals to a central distribution unit apparatus. The distribution apparatus (unit) receives all of the local cables and couples the baseband and broadband channel signals of each cable, into each other local cable, to cause the baseband and broadband signals from each networked appliance to be made available to each other appliance.

In further accord with the present invention, the distribution unit or apparatus further receives RF broadcast television signals which it mixes into the broadband signal channel of each local cable, thereby additionally making the RF broadcast signals available to each networked appliance concurrently with the baseband and broadband signals from each other appliance. In still further accord with the present invention, each interface apparatus includes bi-directional frequency filters for exchanging the computer and media signals from the appliances with the signals from the baseband and broadband signal channels of the local cable. In a still further accord with the present invention the distribution unit apparatus includes a signal bus for cross coupling the baseband and broadband signals among the local cables, the bus having a signal path geometry which minimizes signal interference within the baseband and broadband frequency channels due to signal reflections occurring within the network single.

The present invention provides a fully functional network over signal conductor coaxial cable, such as that presently used in CATV installations, thereby making network performance available at a significantly reduced cost. The invention includes the use of a novel signal distribution unit which interconnects the individual coaxial cables to the CATV signal source connection without the use of signal splitters or signal combiners. The network incorporates a multi-master approach with respect to the networked appliances. The network provides for computer signal speeds of 1.0 Mbps, a 125 Kbps signal speed for infrared control, and up to 158 television channels. The network also provides the network user with the choice of up to sixteen broadcast channels to be reserved for use within the home for audio/video transfer to any room having cable access. These reserved channels may be used for DVD, VCR, DSS, PC, cable box, video camera, security camera, CD jukebox, Home Control, laser disk, web TV, and video games.

Another important feature of the distribution unit or apparatus is the active amplification the unit provides to the broadcast and CATV signals received. Since the majority of the presently installed base of CATV is RG-59 coaxial cable with limited band width of approximately 500 MHz, this means that the subscriber cannot receive television channel broadcast above channel 70. The distribution unit compensates for this by adding active gain which amplifies the broadcast television signal by as much as 15 dB for the high end channel frequencies.

These and other objects, features, and advantages of the present invention will become more apparent in light of the following detailed description of a best mode embodiment thereof, as illustrated in the accompanying Drawing.

BEST MODE FOR CARRYING OUT THE INVENTION

Figures 1, 1A:
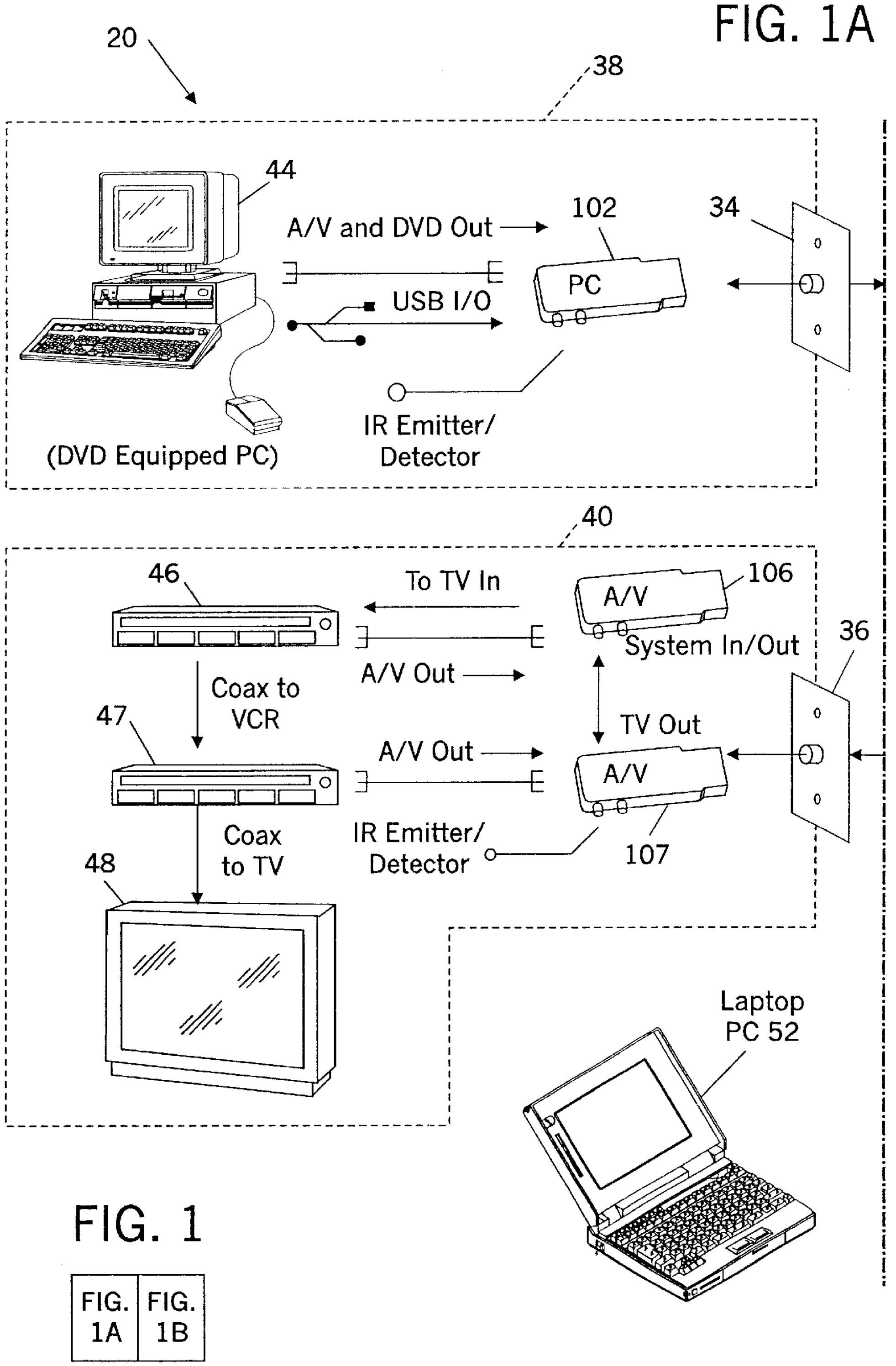
FIG. 1 is an illustrative, somewhat figurative system block diagram of a network embodiment of the present invention.
Figure 1B:
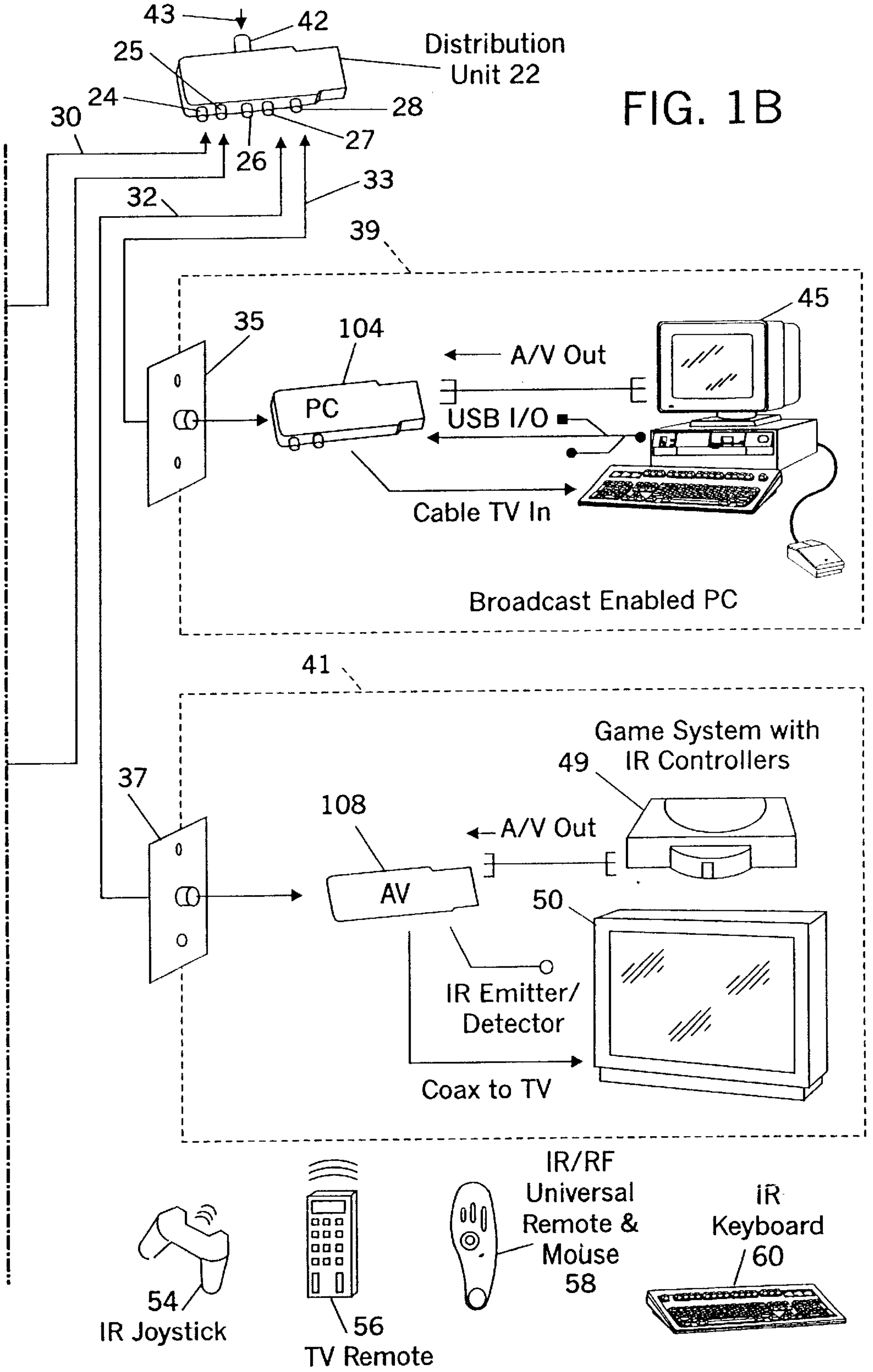

Referring now to FIG. 1, the network 20 of the present invention provides the means by which a user/operator may command and control the performance and interoperability of various electronic devices within a building; typically a dwelling, such as a home, in which multiple electronic devices may be shared by users, or where multiple devices are capable of operating in a cooperative fashion in performing a commanded function. In the best mode embodiment the network is described in terms of a home network in which the different electronic devices within a home, including personal computers, audio receivers, VCRs, and television sets are present. Each of these devices perform a different utility but share a common functional characteristic in that they each provide an electrical signal output, and each are capable of responding to functional commands presented to them in an infrared signal format. As may become evident in the description to follow, the networked electronic devices in a home application may be generally grouped in a "consumer electronics" category, in which they perform either or both of an entertainment and a utility action. Where necessary, or possible, this description will distinguish these devices based on their intended function, but otherwise they will be referred to generally as "appliances."

As shown, the network 20 includes a distribution unit 22 which receives network signals at a plurality of network signal terminals 24–28. Each network terminal is connected to one of a plurality of electrical signal conductors 30–33 comprising the network's communication plant. The conductors 30–33 are routed through the building to individual wall plate connectors 34–37 in different locations 38–41, such as rooms or other divided spaces in the home. The communications plant is the network's means for exchanging network signals between the distribution unit 22 and the appliances at locations 38–41. The distribution unit 22 also receives, at a broadcast signal input 42, broadcast signals, such as television programming signals, either broadband digital signals and/or analog signals, received in a radio frequency (RF) modulated signal format on lines 43 from broadcast signal sources, such as CATV services, or antenna received broadcasts, and/or broadcast satellite services.

The multi-media nature of the present network is demonstrated by the diversity of the appliances illustrated in FIG. 1 as being capable of interconnection through the network. The locations 38, 39 each include digital signal appliances, such as personal computers 44, 45, each of which may themselves include peripheral equipment (not shown), such as printers or signal storage (memory) devices. The location 40 includes a digital satellite signal (DSS) receiver 46, a VCR 47, and a TV 48, with the location 41 having a video game system 49 and TV 50. In addition to these electrically connected, i.e. "wired" appliances, the network is also capable of receiving wireless transmissions from "wireless appliances", such as a laptop computer 52, game joystick 54, TV remote control 56, the network's own remote control 58, and a wireless keyboard. The wireless transmissions are in both the infrared (IR) and radio frequency (RF) frequency bands.

Functionally, the appliance may be broadly grouped as being either digital signal appliances, such as computers and computer peripheral appliances, and RF modulated audio and/or video signal appliances; generally "media" appliances. The computer appliances communicate with each other in serial digital signal format. The media appliances include either analog or digital signal outputs. All of the appliance signals, together with the received broadcast signals, are collectively transmitted through the network in a shared mode, in one of three network allocated frequency bands. The bands include a data and information band with a frequency range substantially from zero to 2.5 MHz, a control and command band with a range substantially from 2.5 to 5.0 MHz, and a broadcast services band substantially above 5.0 MHz. The broadcast services band is that defined by the United States Federal Communications Commission (FCC) as extending from 5.0 MHz to 997.25 MHz. This includes a 5.0 to 42.0 MHz band dedicated to the Data Over Cable Service Interface Specification (DOCSIS) for upstream digital signal communications between a subscriber personal computer (PC) and the cable service provider's "head of network" server, and the CATV broadcast band from 55.24 MHz (CATV channel 2) to 997.25 MHz (CATV channel 158). As known, the ultra high frequency (UHF) television broadcast band, which extends from UHF channel 14 at 469.25 MHz to UHF channel 69 at 801.25 MHz, is within the CATV spectrum.

Preferably, the conductors 30–33 have sufficient bandwidth to accommodate the full CATV broadcast services band. In a best mode embodiment the conductors 30–33 are RG-6 type coaxial conductors, preferably the quad-shielded RG-6QS type, with 75 ohm characteristic impedance and a bandwidth approaching 1.0 GHz. The RG-6 type cable is the present coaxial standard for home installed CATV services in the 1990's. However, the present network also accommodates existing cable service installations using the older, lower bandwidth RG-59 type cable which was the CATV standard in the 1970's and 1980's. The bandwidth of RG-59 cable is in the range of 500 MHz which is below the frequency of CATV channel 65. As described in detail hereinafter with respect to the distribution unit 22, the network provides active gain compensation to the higher frequency channels to improve signal to noise ratio and significantly extend the RG-59 bandwidth beyond CATV channel 80.

Figure 2:
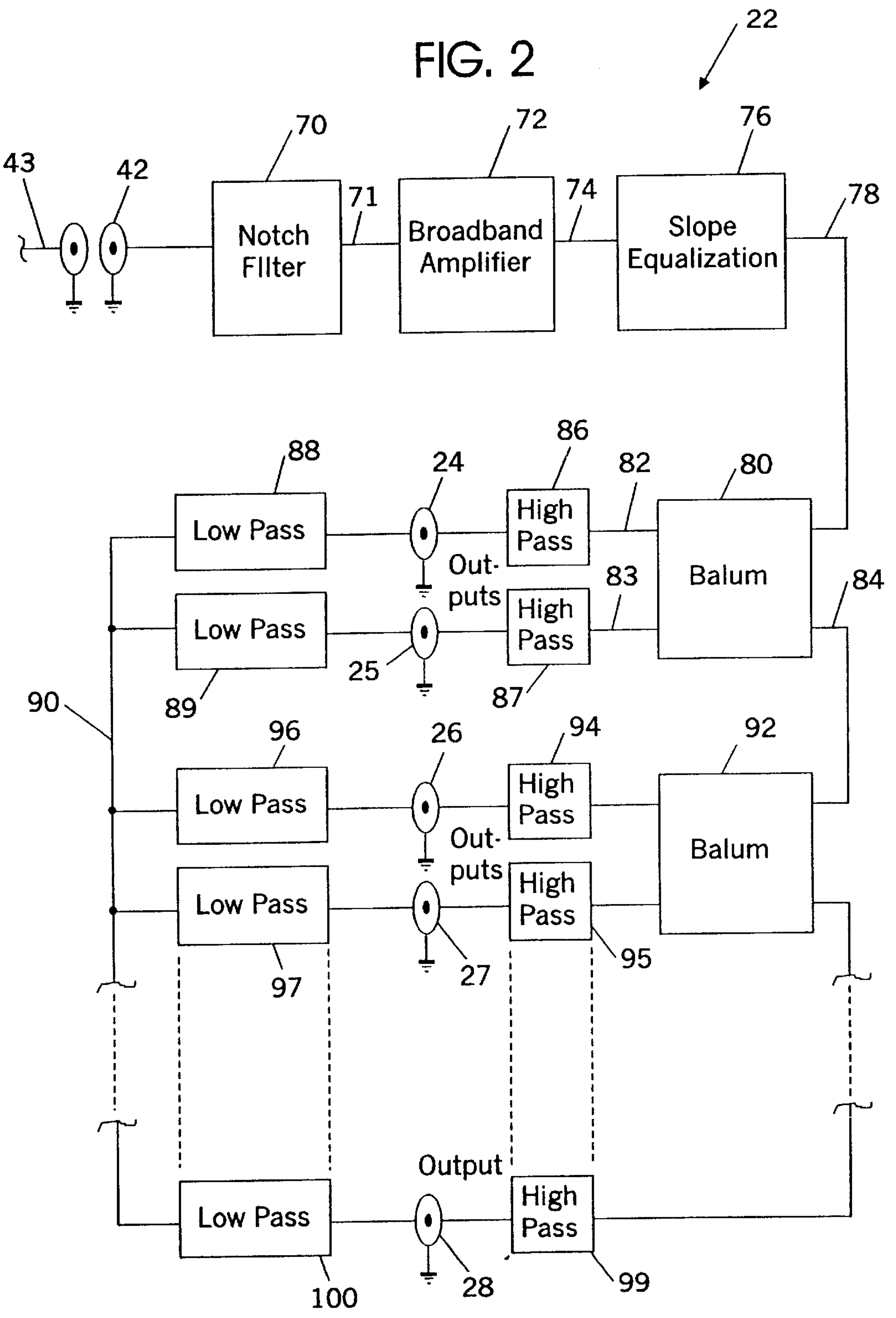
FIG. 2 is a schematic illustration of one embodiment of an element used in the system embodiment of FIG. 1.

Referring now to FIG. 2, which is a schematic block diagram of the distribution unit 22. In the present network, a portion of each broadcast signal spectrum, both CATV and UHF broadcast television, are reserved for internal network use as modulation frequencies for the media signals transmitted through the network. The media signals include both audio and video content as may be available from the network connected appliances. In a best mode embodiment, the reserved spectrum comprises the frequency band between UHF Channels 15–30 (477.25 MHz through 567.25 MHz) and the CATV channels 65–80 (469.25 MHz through 559.25 MHz). It should be understood, however, that the reserved band may be changed in both the reserved range and number of reserved channels as deemed suitable for a given application by those skilled in the art. The broadcast signals received at the distribution unit input terminal 42, from line 43 which are within the reserved spectrums, are blocked by notch filter 70, which has corner frequencies at 469.25 MHz and 567.25 MHz. The notch filter 70 is a standard inductive-capacitive type known to those skilled in the art for attenuating signal frequencies between the filter's lower and upper frequency limits As referred to hereinbefore, the present network includes active gain shaping to extend the actual bandwidth of RG-59 coaxial cable to a higher "virtual" limit by gain shaping the broadcast signals received from the notch filter 70. The received broadcast signals have a nominal 15 dB signal amplitude, however, as they propagate through an RG-59 cable the high frequency channels are attenuated at a faster rate per lineal distance then the low frequency channel. At a 100 foot distribution length a received 15 dB 600 MHz signal is attenuated substantially to 0 dB. The active gain shaping counteracts the high frequency attenuation and provides a usable signal-to-noise ratio signal up to CATV channel 80 (approximately 600 MHz); which is beyond the network reserved RF spectrum. In operation, broadband amplifier 72 provides substantially 15 dB of amplification to the received broadcast signal. The amplifier 72 is a known type RF amplifier, preferably in an integrated circuit embodiment, such as the model RF 2317 high linearity RF amplifier manufactured by RF Micro Devices, Inc., Greensboro, N.C. The RF amplifier has substantially flat gain from 50 MHz to 1000 MHz and a 75 ohm characteristic input/output impedance, which matches the characteristic impedance of the broadcast signal coaxial line 43 and the network's signal conductors 30–33 (FIG. 1).

The amplified broadcast signals are presented on lines 74 to known type slope equalization circuitry 76. As known to those skilled in the art, slope equalization refers to an active circuit whose signal gain increases with increasing signal frequencies within the amplifier's bandwidth. An active amplifier, such as the RF Micro Devices, Inc. model RF 2317 RF amplifier is adapted for use with an inductive-resistive output load which is functionally placed in parallel with the amplifier voltage source (Vcc) feed L-R network. This causes the amplifier output to be more severely loaded and the output signal to be more severely attenuated at the lower frequency, thereby reducing the gain provided by the broadband amplifier 72 at low frequencies. As the signal frequency increases the output loading is reduced as the shunt inductor reactance increases with frequency, thereby substantially reducing the attenuation of the higher signal frequencies. The net effect of the combined RF gain (amplifier 72) and slop equalization circuitry 76 is to extend the useable circuit band width by providing a substantially constant 15 dB signal strength over a frequency range up to 600 MHz. The gain shaped, notch filtered broadcast signals (i.e. "conditioned broadcast signals") are presented at the output of the slope equalization circuitry on lines 78.

The conditioned broadcast signals are presented on lines 78 to a balance to unbalance mixer (BALUM) 80, which is a known type frequency mixer, such as the TOKO model S617 dB-1010. The BALUM takes the output signal from the slope equalization circuitry and converts it to 75 ohm impedance signals which it provides on lines 82, 83 and 84. The signals on lines 82, 83 are presented through high pass frequency filters 86, 87 to network terminals 24, 25 where they are distributed by conductors 30, 31 to the appliances in locations 38, 40 (FIG. 1). The high pass filters provide low impedance coupling of the broadcast signals to the network terminals while also blocking the low frequency signals that are simultaneously coupled to the terminals 24, 25 through low pass filters 88, 89 from the low frequency bus 90.

Figure 3:
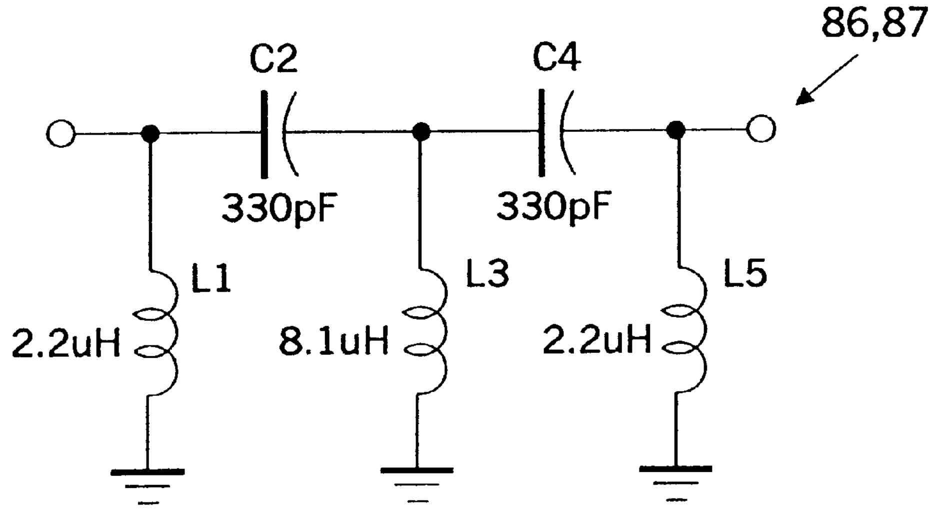
FIG. 3 is a schematic illustration of one embodiment of a component used in the element embodiment of FIG. 2.

In a best mode embodiment the high pass frequency filters 86, 87 are known type, balanced impedance, double Pi section, shunt inductor—series capacitor type filters, as shown in FIG. 3. The inductor and capacitor component values shown are illustrative of an acceptable combination of component values which produce a balanced, substantially 75 ohm impedance, and a break frequency (or −3 dB frequency) of substantially 5.0 MHz. It should be understood, however, that various other combinations of component values may be used as deemed suitable by those skilled in the art to achieve comparable filter performance. Similarly, it must also be understood that the embodiment of the filters 86, 87 is not limited to the filter implementation shown, but that various other known forms or types of filters can be used, as may be deemed suitable for the intended purpose by those skilled in the art.

Figure 4:
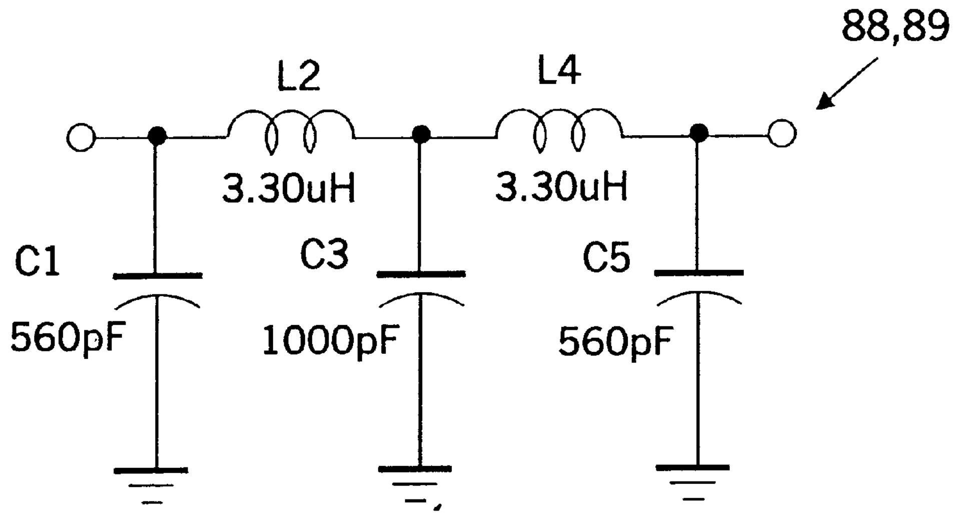
FIG. 4 is a schematic illustration of one embodiment of another component used in the element embodiment of FIG. 2.

Conversely, low pass frequency filters 88, 89, having a nominal −3 dB frequency filter comer frequency of 4.5 MHz, block the conditioned broadcast signals from the BALUM 80 from being coupled onto the low frequency bus 90. The low frequency bus 90 carries the low frequency data and information band signals (0–2.5 MHz) and the command and control band signals (2.5–5.0 MHz), and couples these low frequency signals between each of the network terminals through low pass filters, such as the filters 88, 89 associated with the network terminals 24, 25. In a best mode embodiment the low pass filters 88, 89 are each balanced impedance, double Pi section, shunt capacitor–series inductor type filters, as shown in FIG. 4. The inductive and capacitive values shown in FIG. 4 are only illustrative of an acceptable combination of component values which produce a balanced, substantially 75 ohm impedance, and a −3 dB frequency of substantially 4.5 MHz. It should be understood, however, that various other combinations of component values may be used as deemed suitable by those skilled in the art to achieve comparable filter performance. Similarly, it must also be understood that the embodiment of the filters 88, 89 is not limited to the filter implementation shown, but that various other known forms or types of filters can be used, as may be deemed suitable for the intended purpose by those skilled in the art.

The remaining output of the BALUM 80, on line 84 is presented to a cascaded, substantially similar type BALUM 92. The BALUM 92 couples the high frequency signals through high pass frequency filters 94, 95, which are substantially similar to the high pass filters 86, 87, to the network terminals 26, 27 (FIG. 1). Similarly, low pass frequency filters 96. 97, which are substantially similar to low pass filters 88, 89, block the high frequency broadcast signals from passing through to the low frequency bus 90. Subject to signal power losses of approximately −3 dB per BALUM stage, successive BALUM stages may be added as required to provide the necessary number of signal outputs in a given network, thereby completing the distribution unit output at terminal 28. Terminal 28 is similarly connected to high pass and low pass frequency filters 99, 100, which are each similar to the corresponding filter types described hereinbefore.

One novel aspect of the present network is the "shared mode" transmission of low frequency digital signals (0–5 MHz band) with RF broadcast services signals (above 5 MHz) through common coaxial conductors. Each individual coaxial conductor 30–33 supports bi-directional network signal transmission, i.e. simultaneous upstream network signals (from appliances to distribution unit 22) and downstream network signals (from distribution unit to appliance). This includes the combined computer digital signals and the RF modulated broadcast signals at frequencies approaching 1.0 Ghz, all of which are transmitted in shared mode. As described hereinafter, the data and information band signals (0–2.5 MHz) are transmitted at signal speeds of substantially 1.0 Mbps and the command and control band signals at signal speeds of substantially 125 Kbps. This is a distinct simplification of the CEBus Standard which requires separate coax cables for upstream and downstream RF signal transmission, and separates digital signal transmission onto a twisted pair conductor. Although the present network's simplification of the communications plant reduces the cost of installation for new construction in a marginal way, it is its ability to be used with existing CATV installed wiring that provides a substantially lower network cost for of existing wired homes.

The upstream network signals received by the distribution unit are separated by the distribution unit into low frequency (0–5 MHz) digital signals which are coupled through the low pass filters 88, 89 et al to the low frequency bus 90, and high frequency (>5.0 MHz) RF signals which are coupled through the high pass filters 86, 87 et al. to the BALUMS 80, 92 et al. The broadcast signals are combined with the media signals in forming the downstream network signal. Since the low frequency and high frequency signal transmission are independent of each other, the low pass frequency filters provide a direct bypass between the distribution unit's terminals 24–28 (FIG. 1) to maintain digital signal speed. Similarly, the signal separation provided by the combined low pass and high pass frequency filters allows for the flexibility of providing "upstream" DOCSIS transmission (in the 5.0 to 42.0 MHz) through the distribution unit. Although not a functional characteristic of the present network embodiment, the distribution unit and the network interfaces may be readily adapted through the use of bi-directional amplifiers as known to those skilled in the art to provide upstream cable services.

The low frequency digital signal bands (0–5.0 MHz) and the high frequency RF signal bands (>5.0 MHz) require different interface apparatus between their respective type appliances and the network. As stated hereinbefore, in the embodiment of FIG. 1 two general categories of appliances are shown; computer equipment and audio/video equipment. The audio and video appliances which are generally dependent for their performance on RF modulated signals are herein referred to generically as "media appliances", and the computer related equipment are dependent on digital signal formats for performance are referred to as "computer appliances". This is done for convenience of description Similarly, the signals related to the media appliances (whether input or output signals) are referred to as media signals and those associated with the computer appliances are referred to as computer signals. The computer appliances interface with the network through a network "PC modulator", such as the PC modulators 102, 104 of FIG. 1, and the media appliances interface with the network through an "AN (audio/video) modulator", such as the A/V modulators 106–108 of FIG. 1.

As will be apparent in the following detailed description of the PC modulator and the A/V modulator, they have common functional features. Each type modulator receives the shared-mode, downstream network signals and separates the low frequency digital signals (0–5.0 MHz) from the high frequency RF signals (above 5.0 MHz), and further separates the data and information signal (0–2.5 MHz) from the control and command signal (2.5–5.0 MHz). Each includes a microprocessor responsive to the computer signals and each includes an RF modulator to provide for RF modulation of the media signals at any of the 16 CATV and 16 UHF user reserved channel frequencies for network distribution to other appliances.

Figure 5A:
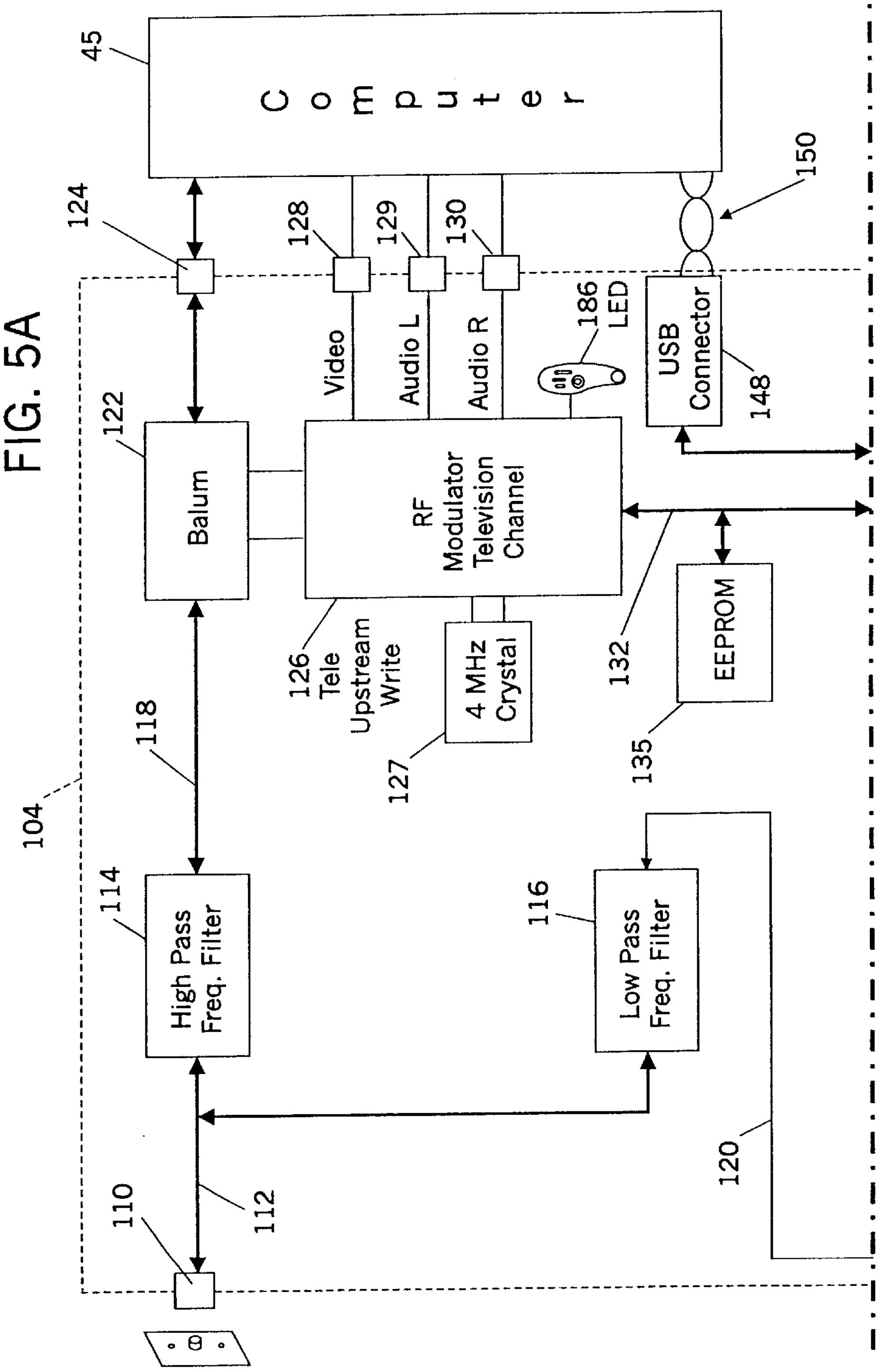
FIG. 5 is a schematic illustration of one embodiment of another element used in the system embodiment of FIG. 1.
Figure 5:
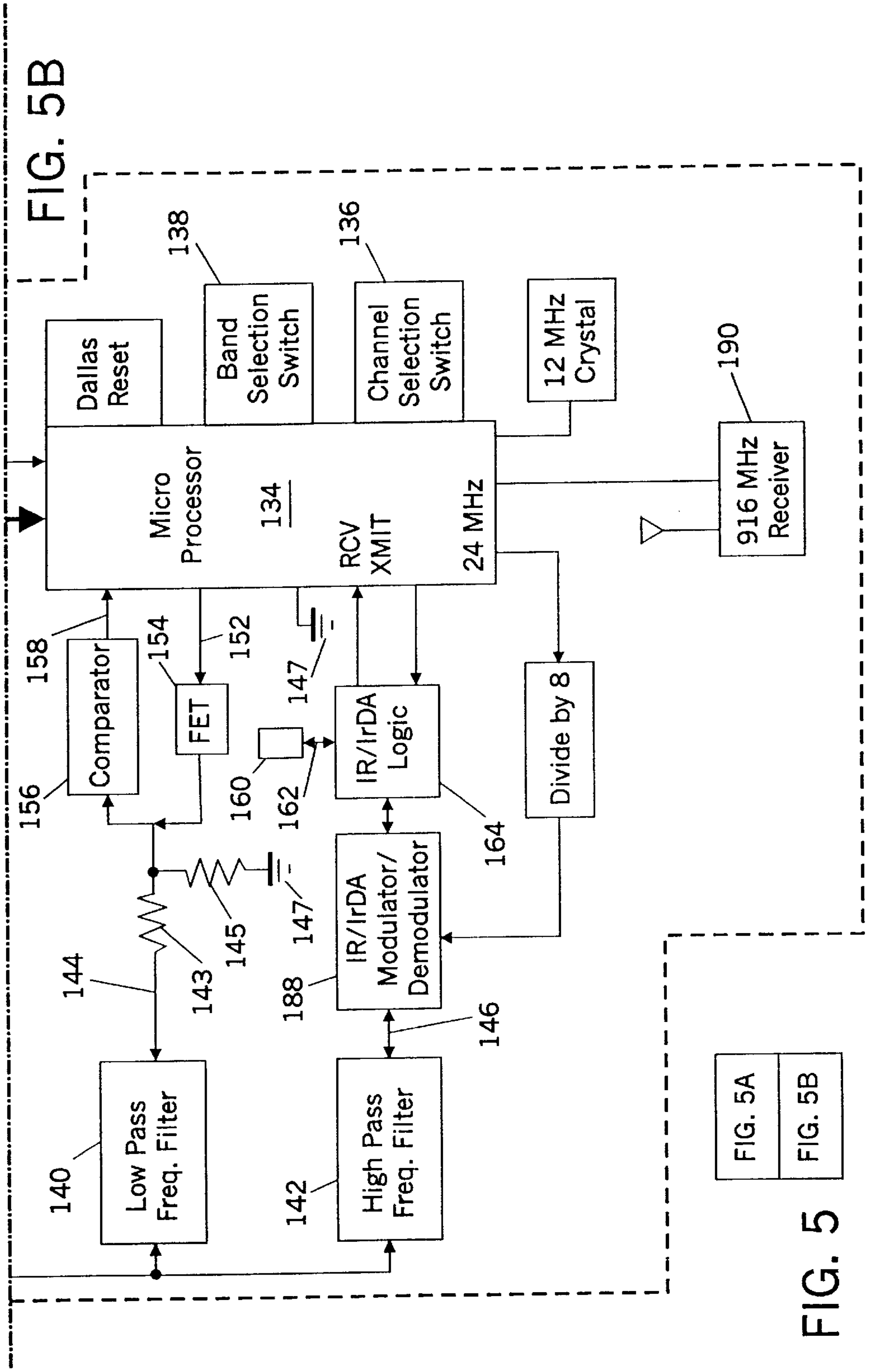

Referring now to FIG. 5, in a schematic block diagram of PC modulator type apparatus 102, 104 the downstream network signal is received at a coaxial connector terminal 110 and presented jointly through lines 112 to high pass frequency filter 114 and low pass frequency filter 116. The filters 114 and 116 are substantially similar, respectively, to the high pass filters and low pass filters 88, 89 described in detail hereinbefore with respect to FIGS. 3 and 4. The high pass filter 114, alternately referred to as an RF modulated video signal frequency filter, is a minimum third order filter, and it filters the downstream RF broadcast television signals and RF modulated video signals onto line 118. The low pass filter 116 segregates the low frequency digital signals onto lines 120.

The filtered RF modulated signals on the line 118 are presented through a BALUM 122, such as the TOKO model S617 dB-1010, to the PC modulator's video signal output 124. In a preferred embodiment the user PC connected to the video output 124 is a broadcast enabled computer (e.g. 45, FIG. 1) which, with appropriate receiver cards and supporting software allow the PC to display RF broadcast signals or user video content provided on one of the reserved RF spectrum channels.

The BALUM 122 is also connected for response to an RF modulator 126 which modulates the audio/video content provided on PC modulator terminals 128–130 from the media output of the user's computer 45. The modulator is of a known type, such as the PHILIPS Model TDA8822 programmable RF modulator, with a 4 MHz RF crystal oscillator 127. The modulator 126 generates an RF TV channel on one of the reserved spectrum channels from baseband audio and video signals received at terminals 128–130, and two phase-lock-loop (PLL) frequency synthesizers within the TDA8822 set the picture carrier frequency and the sound subcarrier frequency to the selected channel. The modulator provides the TV signal as a symmetrical output, and the BALUM 122 converts it to an asymmetric 75 ohm impedance which it provides back on lines 118, through high pass frequency filter 114 and the coaxial connector 110 to the distribution unit.

The RF TV signal from the modulator 126 meets U.S. Federal Communications Commission (FCC) requirements for broadcast TV channels; namely a 6 MHz channel bandwidth with −30 dB suppression from peak carrier level of any spurious frequency components more than 3 MHz outside the channel limits. Peak carrier power is limited to less than 3 m Vrms, but more than 1 Vrms, in 75-ohms, and the RF signal is hard-wired to the ultimate receiver through the network cabling. The channel spectrum has a picture carrier located 1.25 MHz from the lower band edge. This carrier is amplitude modulated by the received video signal. For color signal, a second subcarrier is added 3.58 MHz above the picture carrier. The aural (sound) carrier is 4.5 MHz above the picture carrier and is frequency modulated with the audio signal to a peak deviation of 26 KHz.

The RF modulator's performance, including the selected reserved RF spectrum channel used for modulation, is controlled through command signals received on an $I^2C$ multi-master bus 132 from a microprocessor 134. The microprocessor 134 is of a known type, such as the ANCHOR Corporation Model AN2131QC eight bit microprocessor, which sends commands in $1^2C$ bus format to the modulator 126. Typically RF channel programming of the modulator is achieved by having the processor 134 send an address byte and four data bytes which initialize the picture carrier frequency, the sound subcarrier frequency, and the video modulation depth. The picture carrier IS frequency is that associated with the user selected RF TV channel of the reserved RF spectrum, and the parametric data for each user reserved channels is stored in an a non-volatile, re-writable memory storage device, such as an EEPROM 135 connected to the $I^2C$ bus 132. The RF channel to be used is selected by the user through a command input device to the processor, such as a multi-position switch 136 having a set point for each reserved spectrum channel. This channel selection switch 136 is used in conjunction with a band selection switch 138 which, in a best mode embodiment, allows user selection of either the CATV or the UHF channels of the reserved spectrum, as described hereinbefore with respect to the distribution unit 22.

With respect to the low frequency digital signals of the downstream network signals passed by filter 116 onto lines 120, low pass filter 140 couples the 0–2.5 MHz data and information frequency band signal onto line 144 and high pass filter 142 couples the 2.5–5.0 MHz command and control frequency band signal onto line 146. The 0–2.5 MHz data is presented from line 144 through an interface impedance matching network comprising series resistor 143 connected to the signal input and output (I/O) ports of the microprocessor 134, and shunt resistor 145 connected from the series resistor 143 to signal ground 147, which is the low voltage potential side of the PC modulator 102, 104 and of the computer appliance 45. The impedance matching network provides an impedance value to signals propagating through filter 140 to the line 144, which approximates the characteristic impedance provided by the coaxial cable, thereby providing a substantially balanced load impedance to the unmodulated digital signals propagating in each direction, i.e. bi-directionally, through the filter 140.

Figure 7:
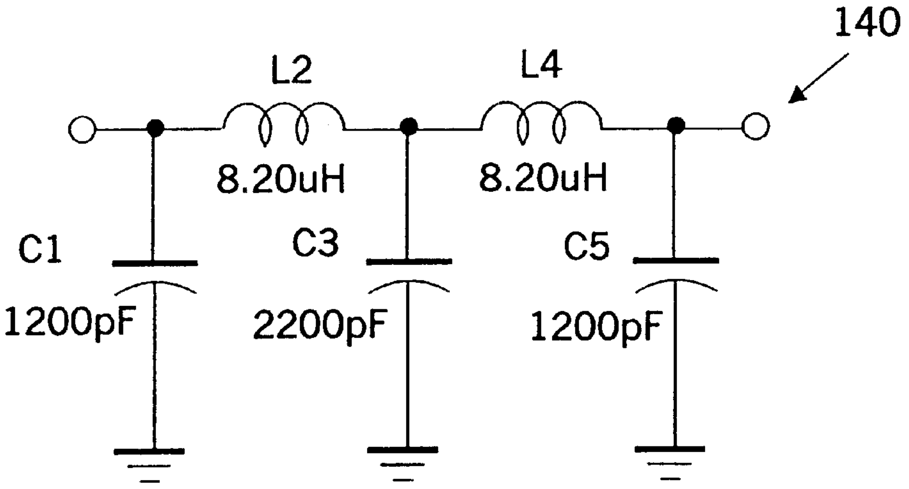
FIG. 7 is a schematic illustration of one embodiment of another component used in the element embodiments of FIGS. 5 and 10.

A preferred embodiment of the low pass filter 140, which is also referred to as an unmodulated digital signal filter, is shown in FIG. 7 as a balanced impedance, double Pi, shunt capacitor—series inductor type filter. The filter is a minimum third order filter, and is preferably a fifth order filter. The inductive and capacitive values shown are only illustrative of an acceptable combination of component values which produce a substantially balanced 75 ohm impedance and a −3 dB frequency of substantially 2.0 MHz. However, it should be understood that various other combinations of component values may be used as deemed suitable by those skilled in the art to achieve comparable filter performance. Similarly, it must also be understood that the embodiment of the low pass filter 140 is not limited to the filter implementation shown, but that various other known forms or types of filters can be used, as may be deemed suitable for the given application by those skilled in the art.

Figure 6:
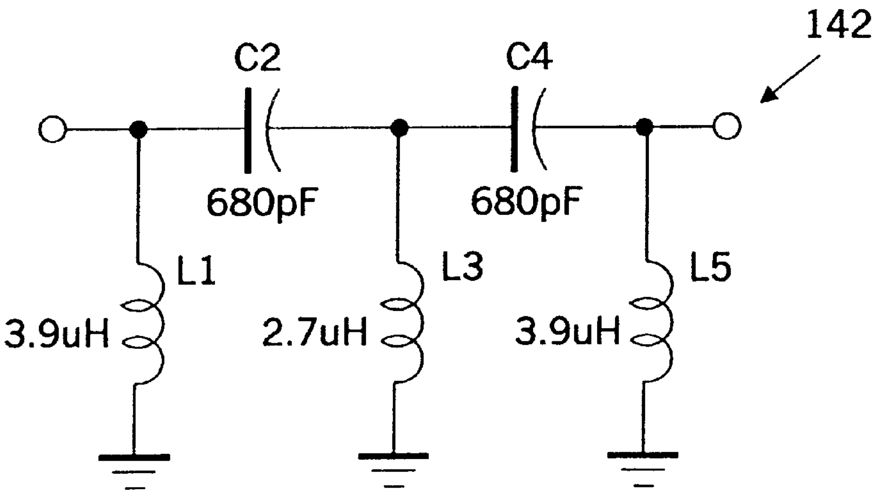
FIG. 6 is a schematic illustration of one embodiment of a component used in the element embodiments of FIGS. 5 and 10.

The high pass filter 142, which is also referred to as an electrical command signal filter, is a balanced impedance, double Pi, shunt inductor—series capacitor type filter, as shown in FIG. 6. As with low pass filter 140, the inductive and capacitive values shown for the high pass filter 142 are only illustrative of an acceptable combination of component values which produce a substantially balanced, 75 ohm impedance and a −3 dB frequency of substantially 2.5 MHz. It should again be understood that various other combinations of component values may be used as deemed suitable by those skilled in the art to achieve comparable filter performance. Similarly, it must again also be understood that the embodiment of the high pass filter 142 is not limited to the filter implementation shown, but that various other known forms or types of filters can be used, as may be deemed suitable by those skilled in the art.

In the best mode embodiment the signal form and protocol of the 0–2.5 MHz data and information band is frame formatted in accordance with the universal serial bus (USB) standard. As known the USB standard defines a combination architecture and protocol developed by a consortium of computer and software manufacturing companies for the purpose of simplifying the connection of peripheral equipment to a PC. It is presently incorporated in all newly manufactured PCs. The object of USB is to provide a simpler "plug and play" connection of printers, keyboards, and telephony adapters to the PC without concern over I/O and DMA addresses. It also facilitates merger of the PC with telephone devices for voice/data applications. Therefore, the network facilitates USB communications between network connected USB PCs.

The PC modulator 102, 104 accomplishes this through the microprocessor 134, which includes a USB connector 148 adapted to receive a four wire USB cable 150 which carries a differential signal and power from the user PC 45. The user PC 45 is considered the "host" under the USB's "host" and "hub" protocol, and it initiates the exchange of information, in the form of a transaction, with various peripheral equipment "hubs" connected to the network. In these transactions the PC modulator, and in particular the microprocessor 134, appears as a compound device, not a hub. The microprocessor 134 relays the transactional exchanges to the PC 45 over the cable 150 and to the addressed device through the network.

As known, the USB standard requires a serial bit, frame formatted signal with a full speed signaling bit rate of 12 Mbps. The frame is the basic quantum of time for periodic data transfers, and they are issued every millisecond,. The frames are organized in packets and four types of packets comprise the basic transaction units. These include "Start Of Frame" (SOF), "Token", "Data", and "Handshake" packets. An SOF packet is 24 bits and includes a packet ID, an 11 bit framing number, and a 5 bit CRC. A Token packet is also 3 bytes long and is used by the host controller to pass temporary control to each device "endpoint", giving it the opportunity to send data or status information. A Data packet always has a packet ID and a 16 bit CRC, and carries a variable length data field that is dependent on the transfer type. A Handshake packet has only an 8 bit packet ID and it is used to report the status of a data transfer for all but isochronous transfers.

The USB also embodies a multi-master protocol in that the host or any hub may initiate a transaction. For example, the host PC 45, may initiate a transaction by sending a Token packet describing the type and direction of the transaction to a second USB PC (e.g. the PC 44 in FIG. 1). The Token packet includes the targeted device address, and the endpoint number. The addressed device selects itself by decoding the address field. In the transaction data may be transferred either from the host to the target device or from the target to the host. The direction of data transfer is specified in the Token packet. The source of the transaction then sends a Data Packet or indicates it has no data to transfer. The destination in general responds with a Handshake Packet indicating if the transfer was successful.

As stated hereinbefore, the PC modulator facilitates the USB transactions by exchanging packets between the user PC 45 and the network, and the network transmits the packets within its transmission of network signals to each of the other network connected PC modulators. However, contrary to the USB requirement for differential output drivers which require two conductors to send a signal, the network uses a single conductor coaxial cable to distribute the network signals. In addition USB drivers require signal reflections from the end of the cable to fully switch on and off, and this generally limits usable USB cable lengths to substantially five meters. The network's communication plant coax, however, is much longer than 5 meters since it distributes the network signal throughout the house. Therefore, although the microprocessor 134, through its USB connector 148 and cable 150, exchanges data in USB protocol with the user PC 45, it removes the USB frame and sends the data out to the network in an IrLAP protocol, as specified in a USB to IR conversion standard developed by the Infrared Data Association (IrDA) and entitled: *Universal Serial Bus IrDA Bridge Device Definition*. This IrDA protocol is embedded in the USB protocol and the steps required to transition from USB to IrDA are described in detail hereinafter. The IrDA standard is designed for half duplex signaling, which is appropriate for a single conductor cable such as a coax. Therefore, transaction sequencing between the microprocessor 134 and the user PC 45 is governed by the USB protocol while transaction sequencing through the network is governed by the IrDA standard IrLAP protocol.

The microprocessor 134 forwards each IrDA packet to the network through lines 152 and an impedance matching/signal driver device, such as a field effect transistor (FET) or equivalent 154, to the line 144. The line 144 carries the bi-directional network signal exchange which includes the half duplex exchange of upstream and downstream IrLAP frames. Each downstream IrLAP frame on the line 144 from the low pass filter 140 is presented to a signal comparator 156, which provides bit state detection and conditioning of the data signal and passes it through line 158 to the microprocessor 134. The processor in turn relays the downstream transaction signal to the PC 45. Conversely, the upstream serial IrLAP digital signals on line 144 from the FET 154 are "backflowed" through the low pass frequency filters 140, 116 to the coax connector 110. As described hereinbefore with respect to FIGS. 5 and 7, the filters 116 and 140 are each balanced to present a substantially equal 75 ohm input impedance to the bi-directional, forward flow and back flow transaction signals passing through them.

As stated hereinbefore, in network of the present invention the signal transmission format of the data and information band signals is a serial digital bit signal transmitted in serial digital form, without signal modulation. These non-modulated signals are transmitted through the coaxial conductors in a shared mode with the RF broadcast services signals. In the disclosed network embodiment the signal bit speed is substantially equal to 1.0 Mbps. This is a selected value which may be considered a nominal signal speed for use in a home network application, and which provides a conservative performance balance between throughput requirements and signal nose considerations, such as electromagnetic interference (EMI), associated with high switching speeds. In the best mode embodiment the low pass filters within the signal transmission path, including the filters 88 et seq, 116 and 140 provide sufficient dampening of the digital signal ringing to accommodate higher bit speeds within the 0 to 2.5 MHz band.

The network's 2.5–5.0 MHz command and control band is used to facilitate wireless infrared (IR) signal communications associated with the network. Referring again to FIG. 1, the network's wireless IR communications function includes the operator/user's control of network connected appliances through an IR remote control device 56, or the user's IR wireless transfer of data files and/or signal commands between a lap top computer 52 and network connected PC 45, or between an IR joystick 54 and a game system 49, or between a wireless keyboard and a network PC 44. As also known, the average IR bandwidth has a signal speed from 32 KHz to 115 KHz. The disadvantages are that it can be easily blocked and it has a limited transmission distance of 2 to 3 meters. The present network capitalizes on the IR advantages and minimizes the disadvantages by distributing the IR command signals through the network to the targeted appliance, thereby overcoming the limitations of obstacles and distance. It does this by detecting IR signals emitted in any location serviced by the network, converting the detected IR signal to a modulated signal which is routed to all network locations, and demodulating the distributed signal back to IR for detection by the targeted appliance.

There is no standard performance specification for legacy consumer IR technology, however, with PC manufacturers using IrDA (Infrared Data Association) IR transceivers for wireless PC communications, and IR transceiver manufactures adding support for legacy consumer IR in their IrDA transceivers, an industry task group is developing guidelines for interfacing IRDA and legacy consumer IR devices with the USB protocol. These guidelines, entitled: *Universal Serial Bus IrDA Bridge Device Definition*, are published in a preliminary Revision 0.9, dated Jul. 6, 1998, which is herein incorporated by reference. The guidelines functionally define an IrDA Bridge device capable of interfacing legacy consumer IR technology and IrDA wireless LAN technology with a host USB device, such as user PC 45 shown connected to the network in FIGS. 1, 4.

As more fully described hereinafter, emitted IR signals within a network site, either consumer IR or IrDA protocol, are detected by IR detectors disposed within the PC modulators (102, 104, FIGS. 1, 4) and A/V modulators (106–108, FIG. 1). The detected IR signal content, which may include the identity of the target appliance as well as the data or command content within a "payload" portion of the signals serial bit frame, is modulated to an electrical signal equivalent, formatted in accordance with the above cited guidelines, and distributed as part of the upstream network signals through the communications plant 36 and distribution unit 22 to each of the network's other PC modulators and A/V modulators. Each of the receiving PC and AN modulators demodulates the distributed signal to its IR signal equivalent and transmits it through an IR emitter into the spatial location. A targeted appliance which is within the field-of-view of the emitted IR signal can respond to the command by performing the commanded task, such as turning on a television or downloading files from a laptop computer.

Figure 8:
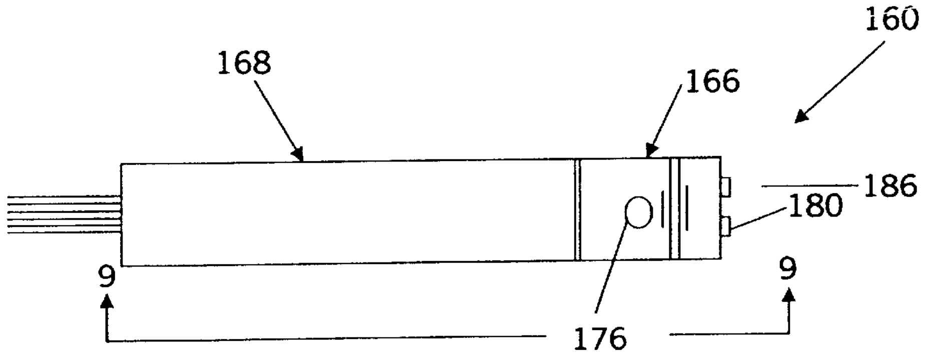
FIG. 8 is an illustrative top view of another element used in the system embodiment of FIG. 1.
Figure 9:
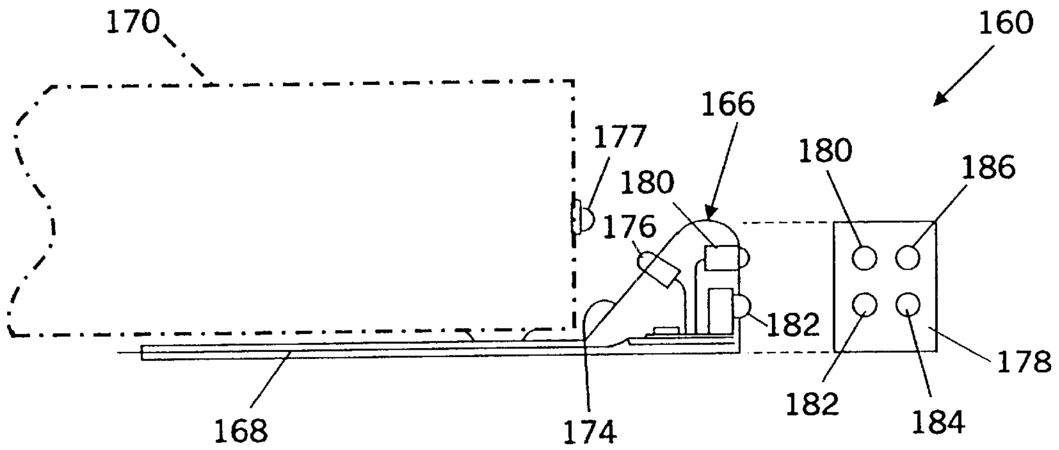
FIG. 9 is an illustrative side view of the element of FIG. 8.

Referring again to FIG. 5, the PC modulator includes a known type IR transceiver (i.e. a combination IR emitter-detector) 160, such as the Hewlett Packard IrDA Infrared Transceiver Model HSDL-1001 "Infrared IrDA® Compliant Transceiver", which is connected through lines 162 and a telephone type jack (not shown) to an IR/IrDA bridge device 164. In a best mode embodiment the IR emitter-detector combination comprises dual emitters and dual detectors, each positioned to cover complimentary areas of the modulator's field-of-view, thereby minimizing the IR obstacle and transmission distance limitations. FIGS. 8 and 9 illustrate a plan view and side elevation view, respectively, of a suitable IR emitter-detector configuration for use with the present network.

Referring simultaneously to FIGS. 8, 9, an IR emitter-detector combination 160 includes a housing portion 166 (shown in a breakaway side elevation in FIG. 9 to facilitate the description) connected to a mounting base 168. The base 168 is adapted for placement beneath an appliance 170 (shown in phantom) in a manner which positions the housing portion in proximity to the IR detector 172 of the appliance. The housing includes a backplane surface 174 with a mounted first IR emitter 176, and it includes a front surface 178 with: a mounted second IR emitter 180, first and second mounted detectors 182, 184, and a light emitting diode (LED) 186. The backplane is displaced at an obtuse angle, nominally 135 degrees, from the plane of the mounting base to position the network emitter 176 substantially in a line of sight orientation with the IR detector 172 of the appliance 170. Similarly, network emitter 180, together with the network IR detectors 182, 184 provide forward field-of-view coverage. The detectors 182, 184 are positioned within the housing to provide maximum field coverage. The LED 186, which is electrically connected for response to the RF modulator 126 (FIG. 4), flashes when IR signals are being received by detectors 182, 184.

Referring back again to FIG. 5, a detected infrared transmission on the line 162 is in a frame format which includes address and control bytes, as well as optional data, in a "payload" portion of the frame, separate from other overhead bytes. The IR/IrDA bridge device 164, exchanges data between the IR emitter-detector-160 and the microprocessor 134. The IR/IrDA bridge strips out the payload portion of the IR detector frame, preserving the address and control bytes as well as any optional data content, and converts it into one or more IrLAP formatted frames for presentation to the modulator/demodulator 188 on a bandwidth available basis. The modulator/demodulator or frequency modulates the converted signal content at a selected modulation frequency within the 2.5 to 5.0 Mhz command and control frequency band. In a best mode embodiment, the modulation frequency is substantially equal to 3.0 Mhz.

The modulated converted signal is provided by the modulator/demodulator 188 through lines 146 to the high pass filter 142. The modulated IR signal is back-flowed through the filter 146 as well as the low pass filter 116 to the coax connector 110, and transferred in shared mode with the RF broadcast service signals through the communications plant 36 (FIG. 1) to the distribution unit 22. From there it is distributed downstream to each. of the other modulators connected to the network. The downstream command and control signal is passed through low pass filter 116 and high pass filter 142 to the modulator/demodulator 188, which demodulates the signal, passes it to the IR/IrDA bridge device which reformats the payload into an IR frame format and passes it to the IR emitter portion 176, 180 (FIG. 6A, 6B) of the IR emitter-detector combination (i.e. transceiver) 160. The IR emitter broadcasts the signal into the room.

With the present network adapted for use with both consumer IR devices and IrDA standard devices, the user is provided with a range of options in terms of wireless control functions and data communications. While legacy consumer IR devices only transmit and receive IR in the 32–58 KHz range, the IrDa transceiver 160 is capable of receiving and transmitting infrared in excess of 150 KHz. This means that IR video game controllers, infrared headphones, and laptop computers can communicate through the IrDA transceiver from any room of the house, with speeds up to 1 Mbps. This versatile IR command feature allows nearly unlimited flexibility in user IR command of any appliance on the network, no matter where the appliance is located. This, together with the availability of user selectable channels within the reserved RF spectrum, gives the network user a virtual broadcast studio.

The power of the present network in terms of its versatility and three band spectrum, can be further enhanced with the connection of at least one broadcast enabled PC connected to the network through a PC modulator as described hereinabove with respect to FIG. 5. As may be known, a broadcast enabled PC means a PC that has a TV tuner card and a composite video output which allows the PC user to watch television broadcast video on the PC monitor. MICROSOFT WINDOWS 98 (MICROSOFT and WINDOWS 98 are trademarks of the Microsoft Corporation) includes TV viewer software.

The use of a broadcast enabled PC is recommended, but optional. However, USB support is required to attach a PC to the network. The USB based PC must also have installed either MICROSOFT WINDOWS 98 or MICROSOFT WINDOWS 95 (build 950B). With a USB PC connected to the network through a PC modulator, the PC video output can be displayed on, and functionally controlled from, any TV in the house. This versatility makes the computer all the more important in that it allows the display of DVD movies, the internet, 3-D games and more all on a large screen television. The system also allows a laptop computer to interface with the PC in any room in the house in which the IrDA transceiver is located on a PC modulator or A/V modulator, as described in detail hereinafter. The result is that the computer can be a central control station for all of the components attached to the network.

As an example of the flexibility in controlling appliance performance, with the present network it is possible to have the user's PC, such as the PC 45 in location 39 (FIG. 1) display menu choices, in terms of network appliance features/selection, on the TV 48 in location 40. This occurs through user input by the network remote control device 58 (FIG. 1) which is a combination wireless infrared (IR) and wireless RF unit which allows for direct communication between user and the network connected PC through an "on-screen,""user-friendly" interface technology.

The PC modulator 102, 104 of FIG. 5 includes an RF receiver tuned to an assigned RF control frequency; preferably a frequency above 900 MHz to prevent electromagnetic interference with the broadcast service signals. A typical standard frequency is 916 MHz. The remote control 58 includes: a "power button" that turns the various network appliances on and off, a "menu button" that causes application specific menus to be displayed on the user PC display, or any TV display connected to the network, and a "help button" that causes application specific help menus to be displayed. The remote also includes directional capabilities, similar to keyboard arrow keys, and a "select button" that functions like the keyboard enter key.

User actuation of the menu button causes the remote control to substantially simultaneously emit a 916 MHz RF command signal and an IR code signal. In the PC modulator the RF command signal is forwarded from receiver 190 to microprocessor 134 and, through USB connector 148, to the user's PC 45. The user PC functions as the network server, and USB host computer. At the same time the network modulator at the user location detects the remote control IR code signal and notifies the host PC of the user location over the control and command band (2.5–5.0 MHz). The PC responds by changing the TV channel at the user location to a PC Menu channel selected from among the reserved RF spectrum channels. The user may then select a particular menu listed appliance, such as a VCR, and the user selection is forwarded to the PC through the command and control band. The PC responds by sending an IR command through the command and control band to the local TV to change the TV channel to that assigned to the particular VCR.

The user may use the remote arrow keys to move a pointer which is visible on the TV to "point and click" on a menu listed selection for the VCR or, alternately, to select a "next menu" which allows the user to move from menu to menu. If the user selects a VCR selection, such as PLAY, the user PC sends the consumer IR code over the command and control band (2.5 to 5 megahertz) to actuate the VCR PLAY function. A look-up table stored in memory in the PC has the consumer IR codes of the user listed appliances, which were entered during the network setup procedure, at which time the consumer was asked what model VCR he has and which room the VCR is located. This allows the PC to build menus that are specific to every network application.

The IrDa protocol is used for networking computers and printers. IrDa is imbedded in a USB packet and sent through the USB cable to the PC modulator. The PC also sends consumer infrared command through the USB port to the PC modulator. The PC modulator removes IRDA packets and sends them over the 0 to 2.5 megahertz data highway. The Consumer IR signals are removed from the USB packet, then modulated to 3 MHz and sent to the IR pipe on the 2.5 to 5 megahertz band. As an example of the utility provided by this infrared channel, a laptop computer could download files on the infrared channel accessible through a TV in one room to a desktop PC located in another room.

Referring again to FIG. 1, site locations 40, 41 each include various types of media appliances, including a DSS 46, VCR 47, and a TV 48 in location 40 and a game system 49 and a TV 50 in location 41. As should be understood, the media appliances shown are merely illustrative of the various consumer type devices which may be found in a home or other living environment. The network 20 interfaces with the media appliances through an A/V modulator of the type shown in FIG. 10. The A/V modulator is substantially similar to the PC modulator 102, 104 described hereinbefore with respect to FIG. 5.

Figure 10A:
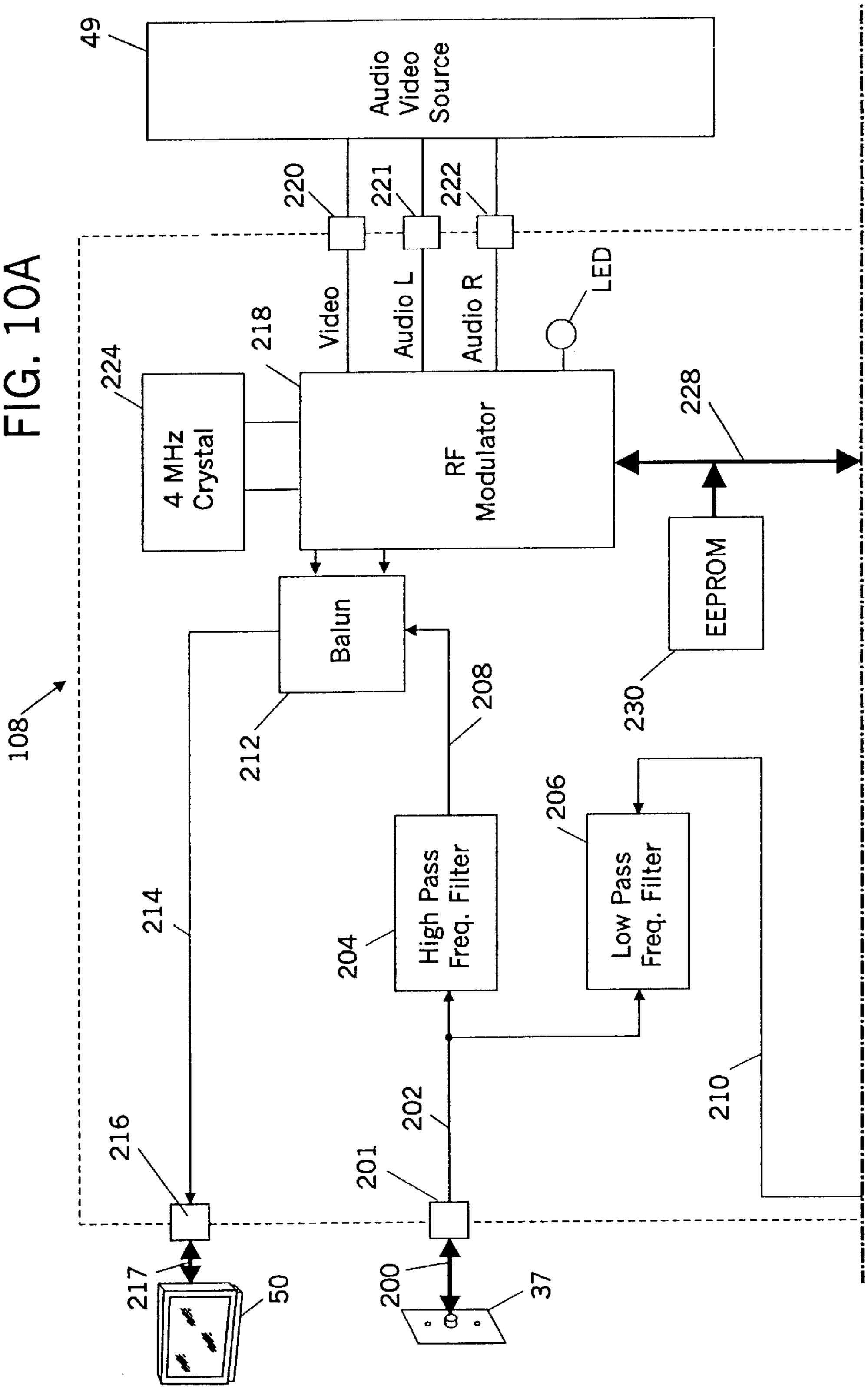
FIG. 10 is a schematic illustration of one embodiment of another element used in the system embodiment of FIG. 1.
Figure 10:
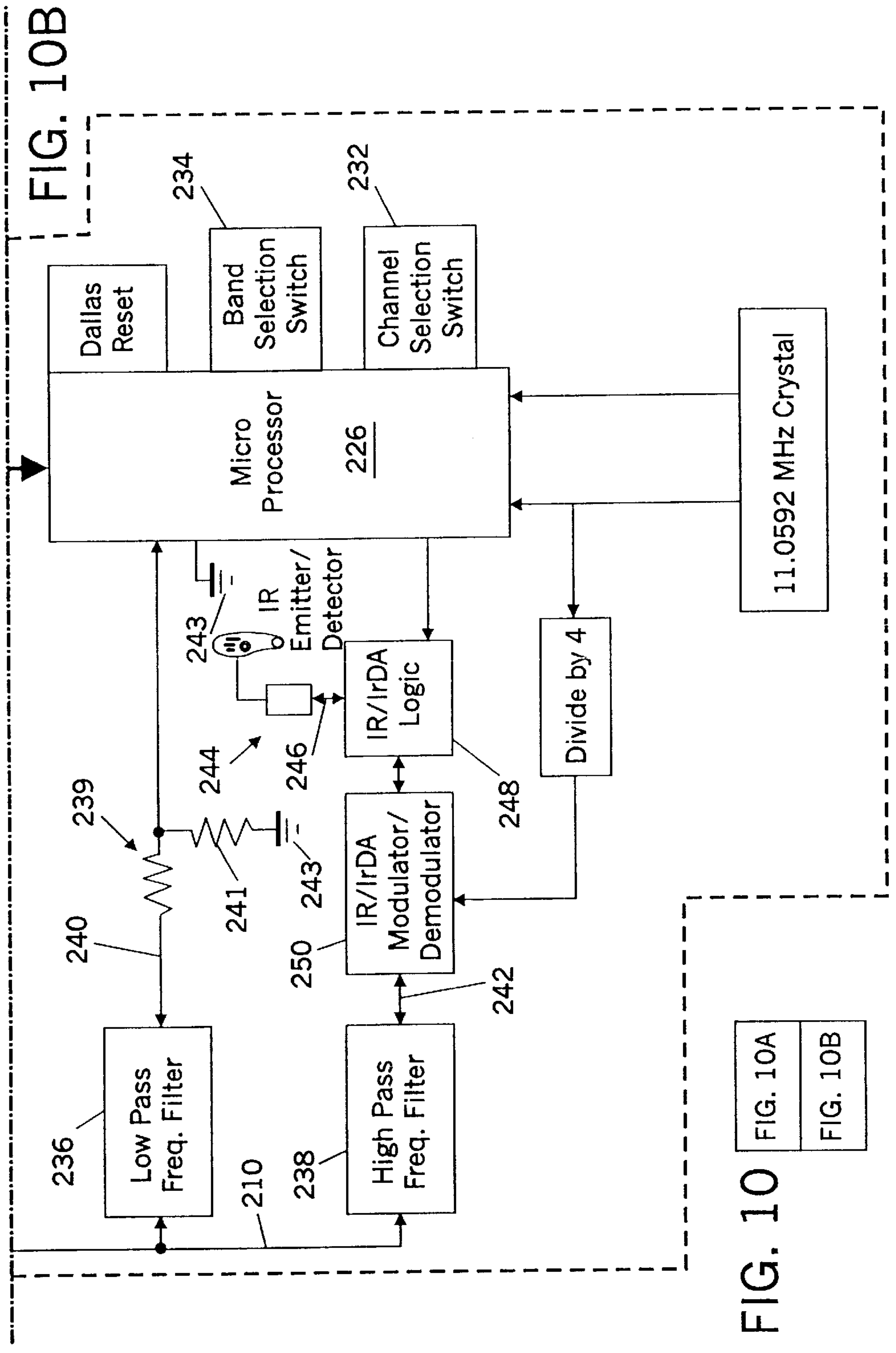

Referring now to FIG. 10, in a detailed block diagram of the audio/video (A/V) modulator 108 connected to the audio/video source 49 and TV 50 media appliances of FIG. 1 the downstream network signal on line 200 from the wall plate connector 37 are received at the modulators coaxial cable connector 201 and conducted through lines 202 to a high pass frequency filter 204, which is also referred to as an RF modulated signal filter, and low pass frequency filter 206. The filters 204, 206 are substantially similar to high pass filters 86, 87 and low pass filters 88, 89 described hereinbefore with respect to FIGS. 3, 4, respectively, and they separate the received RF broadcast televison singals and RF modjlated video signals onto line 208, and the low frequency signals, including the unmodulated digital signals and electrical command signals, onto lines 210.

The downstream broadcast signals on line 208 are presented through a BALUM 212, such as the TOKO model S617 dB-1010, and through lines 214 to the A/V modulator's media signal output 216. The media signal output is connected by a coaxial cable 217 to the TV 50. The BALUM 202 is also connected to the modulated signal output of an RF modulator 218 which modulates the audio/video content provided on the A/V modulator 108 input terminals 220–222 from the audio/video source 49. The modulator 218 may be of the same type as that used in the PC modulator, namely the PHILIPS Model TDA 8822 Programmable RF Modulator with a 4 Mhz RF crystal oscillator 224. The modulator 218 generates an RF TV channel on one of the reserved RF spectrum channels from baseband audio and video signals received at the terminals 220–222, and two phase-lock-loop (PLL) frequency synthesizers within the TDA 8822 set the picture carrier frequency and the sound subcarrier frequency to the selected channel. The modulator provides the TV signal as a symmetrical output, and the BALUM 212 converts it to an asymmetric 75 Ohm impedance which it provides as an upstream media signal. This medial signal is presented on lines 208 back through the high pass frequency filter 204 to the coaxial connector 201 and to the distribution unit (22, FIG. 1).

The RF TV channel signal from the modulator 218 meets FCC requirements for broadcast TV channels as described hereinbefore in detail with respect to the PC modulator (FIG. 5). A microprocessor 226, such as the Phillips Model S83C751 eight bit microprocessor, provides performance control of the modulator 218 through an $1^2$C multi-master bus 228. Typical channel programming of the modulator 218 is achieved by having the processor 226 send an address byte and four data bytes which initialize the picture carrier frequency, the sound subcarrier frequency, and the video modulation depth. The parametric data for each of the user reserved channels is stored in a non-volatile re-writable memory storage device, such as an EEPROM 230 which is accessible through the $I^2$C bus 228. The user selects the RF TV channel to be used through a command input device to the processor 226, such as a multi-position channel selection switch 232 having a set point for each reserved spectrum channel. This channel selection switch 232 is used in conjunction with a band selection switch 234 which, in a best mode embodiment, elects either the CATV or the UHF channels of the reserved spectrum.

The downstream low frequency digital signals from the low pass filter 206 on lines 210 are separated by low pass filter 236 and high pass filter 238, respectively, into the 0–2.5 MHz data and information band signal on line 240 and the 2.5–5.0 MHz command and control band signal onto line 242. The 0–2.5 MHz data is presented from line 240 through an. interface impedance matching network comprising series resistor 239 connected to the signal input and output (I/O) ports of the microprocessor 226, and shunt resistor 241 connected from the series resistor 239 to signal ground 243, which is the low voltage potential side of the A/V modulator 108. The impedance matching network provides an impedance value to signals propagating through filter 236 to the line 240, which approximates the characteristic impedance provided by the coaxial cable , thereby providing a substantially balanced load impedance to the unmodulated digital signals propagating in each direction, i.e. bi-directionally, through the filter 236.

The low pass and high pass filters 236, 238 are substantially identical to the low pass and high pass filters 140, 142 of the PC modulator, which are shown in preferred embodiments in FIGS. 6, 7. As described hereinbefore with respect to the PC modulator of FIG. 5, both of these band signals are transmitted through the network in the IrLAP protocol specified in the referenced IrDA *Universal Serial Bus IrDA Bridge Device Definition*, and which is embedded in the USB protocol. This is made necessary by the single conductor coaxial cable used for the network communications plant; the USB protocol requires a differential (two conductor) transmission mode. Alternatively, if two conductor wire is used instead of coaxial cable the USB standard could be used for intra-network transmissions. As with the USB standard the IrLAP is designed for half duplex signaling, which is appropriate for a single conductor cable.

The microprocessor 226 forwards each upstream IrDA packet to lines 240 which carries the bi-directional, half duplex exchange of upstream and downstream IrLAP frames. Each downstream IrLAP frame is "forward passed" through the low pass filter 236 to the microprocessor 226 and each upstream IrLAP frame from the microprocessor is "back-flowed" through the low pass filters 236 and 206 to the coax connector 200. As described hereinbefore with respect to FIGS. 5 and 7, the filters 116 and 140 are each balanced to present a substantially equal 75 ohm input impedance to the bi-directional, forward flow and back flow signals passing through them. As stated hereinbefore with respect to the PC modulator of FIG. 5, these are serial digital bit signals transmitted in serial digital form, without signal modulation, and they are transmitted through the network conductors in shared mode with the RF broadcast services signals. In a best mode embodiment the signal bit speed is substantially equal to 1.0 Mbps.

The A/V modulator 108 processes the network 2.5–5.0 MHz command and control band signals, i.e., the "IR band" in substantially the same manner as the PC modulator of FIG. 5. It also includes a combination IR emitter-detector 244 which is similar to the dual IR emitter-detector combination 160 of the PC modulator described hereinbefore with respect to FIGS. 8, 9, and which is connected through lines 246 and a telephone type jack (not shown) to an IR/IrDA bridge device 248. The dual emitters/ detectors cover complimentary areas of the A/V modulator's field-of-view within its location (e.g. 41 of FIG. 1) thereby minimizing the IR obstacle and transmission distance limitations. The IR/IrDA bridge 248 strips out the payload portion of all IR signal frames detected by the combination 244, preserving the address and control bytes as well as any optional data content, and converts it into one or more IrLAP formatted frames for presentation to a modulator/demodulator 250 on a bandwidth available basis. As with the modulator/demodulator 188 of FIG. 5, the modulator/demodulator 250 frequency modulates the converted signal content at a preferred modulation frequency of substantially 3.0 Mhz. However, as stated hereinbefore, the modulation frequency may be any selected frequency within the command and control band 8.25–5.0 Mhz.

The modulated IR signal is presented through lines 242 and backflowed through filter 238 to the line 210, where is combined with the upstream data and information band signal from the filter 236. The combined low frequency signals are then backflowed through filter 206 to the coax connector 201 and combined with the RF modulated media signals and coupled through the communications plant 36 (FIG. 1) to the distribution unit 22. From there it is distributed downstream to each of the other modulators connected to the network. The downstream command and control band signal is passed through low pass filter 206 and high pass filter 238 to the modulator/demodulator 250, which demodulates the signal, passes it to the IR/IrDA bridge device 248 which reformats the payload into an IR frame format and passes it to the IR emitter portion 176, 180 (FIG. 6 A, 6B) of the IR emitter-detector combination (transceiver) 244. The IR emitter broadcasts the signal into the room.

The distribution unit 22 (FIG. 2) may also be provided in an alternate embodiment which significantly reduces the unit's parts count, and cost, in certain network applications. These applications include networks which may experience some degree of variation in the network load impedance and/or networks in which the cable run length approach the quarter wavelength distance of the baseband signal frequency, which is 1 Mhz (with a quarter wavelength of approximately 246 feet). Under these conditions, changes in load impedance due open network ports (i.e. unterminated ports whose infinite impedance significantly alters the equivalent load impedance, which is nominally the parallel resistance equivalent of each cable's characteristic impedance.

In other words, in the illustrated embodiment of five port connectors, the load impedance from 1 port connected to all five ports connected ranges from 75 to 37.5 to 25 to 18.75 to 15 ohms. If the unit output signal is scaled to an average 25 ohm load impedance the signal amplitude may change by +50% (for 75 ohms) to −25% (for 15 ohms). Since the BALUMS cannot maintain impedance isolation under those conditions and since the high pass and low pass filters in the network modulator provide sufficient signal separation, it may be deemed suitable by those skilled in the art to remove the BALUMs and unit filters to save cost. The alternate embodiment of the distribution, therefore, removes the BALUMS (80, 92) the high pass and low pass filters (86–89, 94–97, and 99, 100), and combines the high frequency and low frequency busses (78, 90) into a common port bus.

Figure 11:
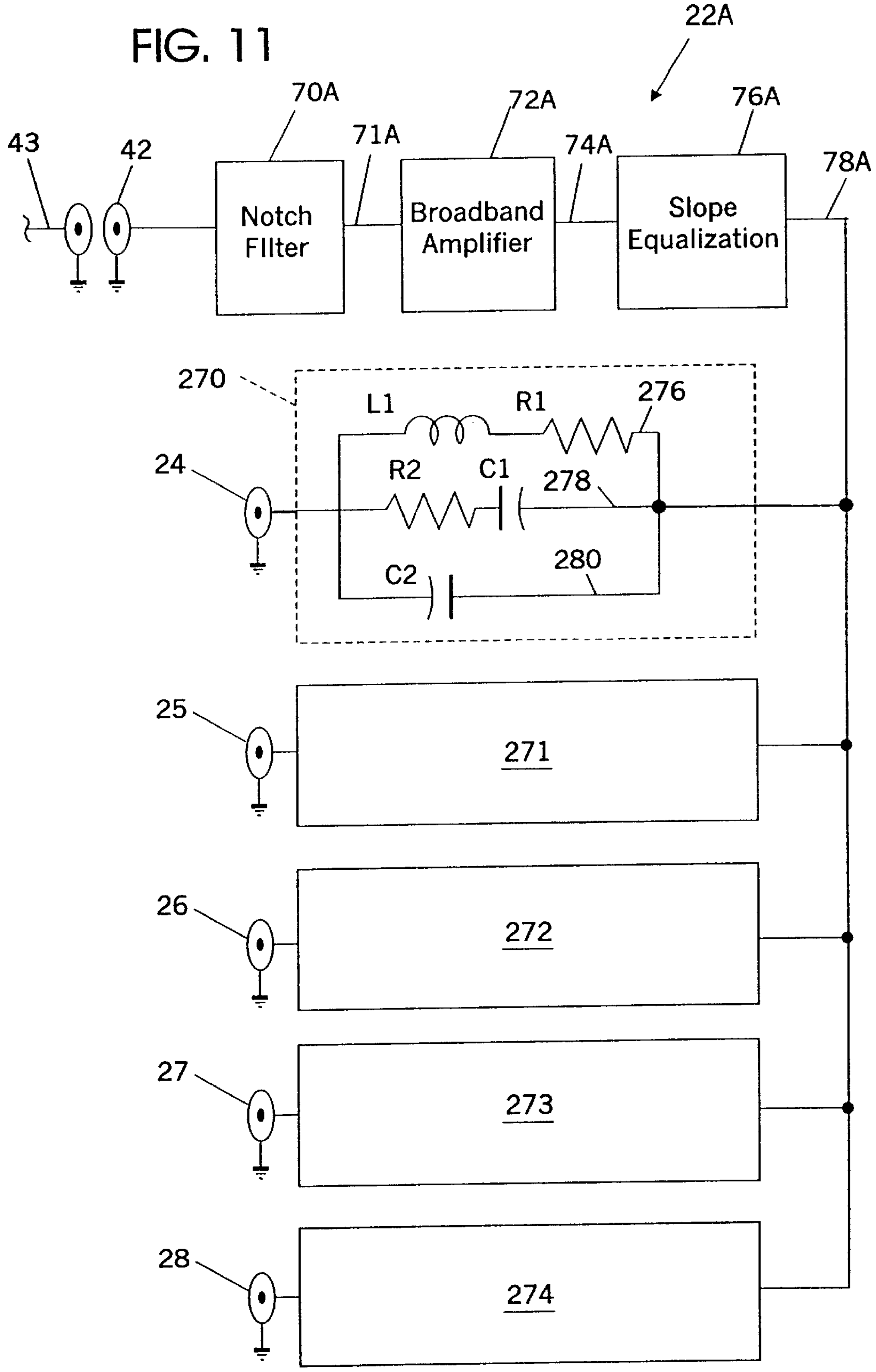
FIG. 11 is a schematic of an alternate embodiment to that of the component embodiment illustrated in FIG. 2.

Referring now to FIG. 11, the alternative embodiment distribution unit 22A includes the same elements as the prior embodiment within the RF broadcast signal path. This includes the CATV and other broadcast source signals received at the distribution unit connector 42 from the line 43 (FIG. 1). This path includes the notch filter 70, broadband amplifier 72 and slope equalization circuitry 76, which perform the same functions described in detail hereinbefore with respect to FIG. 2. The change occurs in the elements and bus circuitry associated with the network ports 24–28. As shown in FIG. 11, each of the network ports is coupled through associated distribution unit impedance matching networks 270–274, each connected between the distribution unit signal bus 78A and the individual output ports 24–28. The distribution unit impedance matching networks, as shown by the circuit 270, comprise three parallel paths, including a series resistor/inductor path 276, a series resistor/capacitor path 278, and a capacitor path 280. The purpose of the impedance circuits is to provide impedance matching between the signal bus and the characteristic impedance of the coaxial cables connected to each output port. In addition, with the loss of signal isolation otherwise provided by the BALUMS and the frequency filters of the FIG. 2 embodiment, the distribution unit impedance matching networks further provide short circuit protection of the network in the event of a short to ground of an output port or its connected cable.

Another consideration of the alternative embodiment of FIG. 11 is the signal path length of each port connector; this is the physical length from the common port bus 78A to each of the ports 24–28. This is of concern with respect to signal reflections occurring at an unterminated port. This signal path length is preferably less than a quarter wavelength of the network's highest frequency signal to prevent signal reflections occurring at an unterminated port at the network's highest operating frequencies. These reflections may cause signal interference with both the broadband and baseband signal frequencies. In the present embodiment, with the CATV broadcast signal frequencies approaching 1 Gigahertz (at or about 900 Mhz), the quarter wavelength of a 1 Ghz signal is approximately 1.3 inches.

Figure 12:
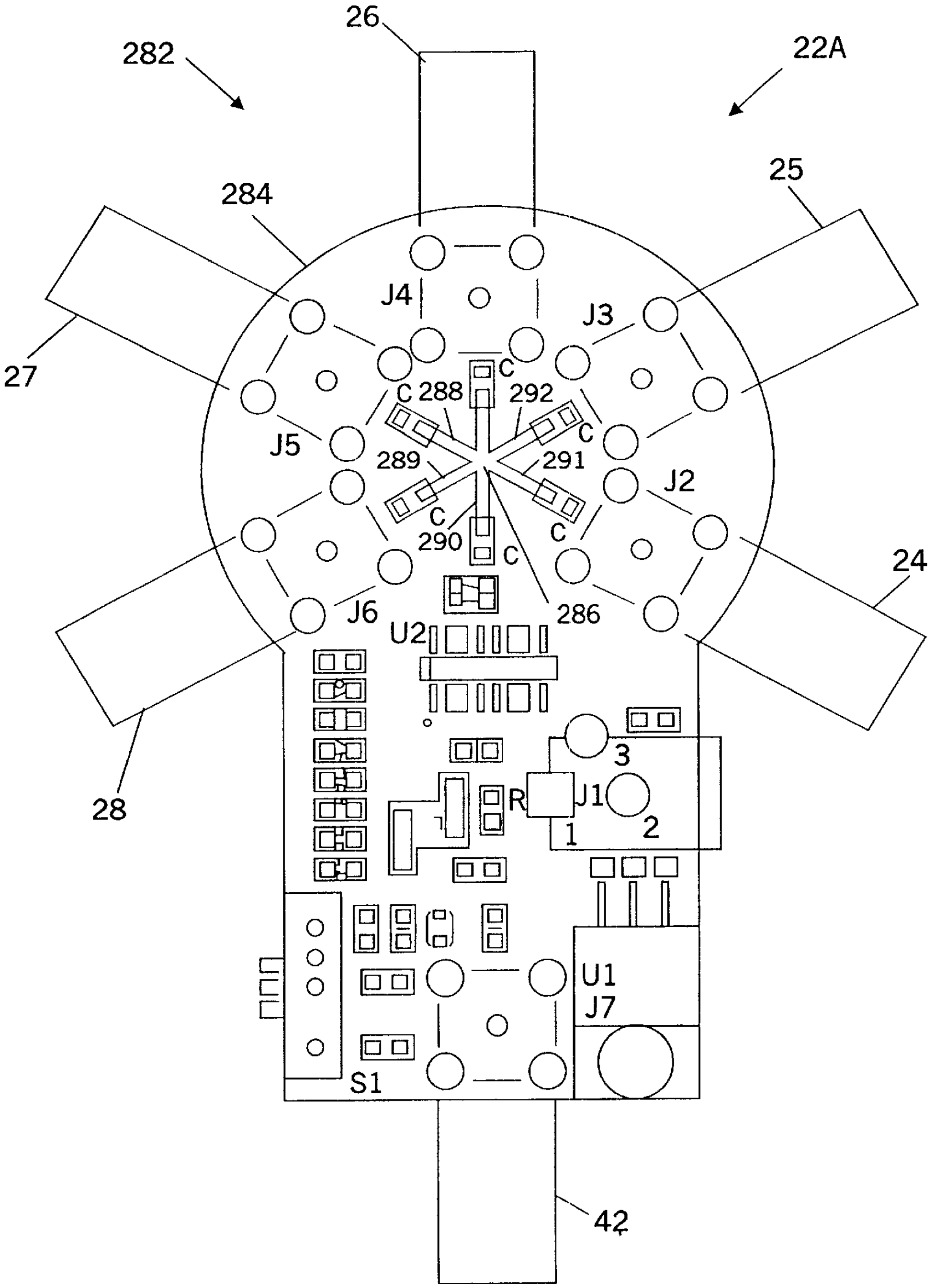
FIG. 12 is a plan view of a mechanical layout of the embodiment of FIG. 11.

Referring now to FIG. 12, which is a plan view of one physical embodiment of an illustrative of housing configuration 282 for the distribution unit 22A. The purpose of FIG. 12 is simply to illustrate one exemplary configuration of the common port bus which limits the bus to port signal path distance to a value less than the critical quarter wavelength value. In FIG. 12 the distribution unit housing is shown to include a "hub" profile 284 in one portion of the housing's overall housing profile. The hub encloses a "star configured common port bus" 286, having port signal paths 288–292 radiating from the bus center. Each port signal path length is approximately equal in length, and each such signal path length is less than the critical length of approximately 1.3 inches Although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

We claim:

1. A method for bi-directionally distributing radio frequency (RF) modulated broadcast television signals from a broadcast signal source to networked appliances making up a complete network comprised of single conductor coaxial cables interconnected through a distribution unit, and connected to the source through the distribution unit and the plurality of single conductor coaxial cables, and simultaneously therewith bi-directionally distributing signals exchanged between the networked appliances over the same coaxial cables throughout the complete network, the exchanged signals including RF modulated video signals from RF modulated video signal appliances and unmodulated digital from digital signal appliances, the coaxial cables having cable characteristic impedance, the method comprising:

installing a device which comprises the distribution unit connected for bi-directionally transmitting and receiving RF modulated video signals on a plurality of interconnected coaxial cables, the distribution unit comprising a multi-drop signal distribution apparatus having a source input for receiving the RF modulated broadcast television signals from the broadcast source and having a plurality of signal ports for receiving the RF modulated video signals and unmodulated digital signals from each of the plurality of coaxial cables;

coupling the RF broadcast signals within said signal distribution apparatus, from said source input to each said signal port;

coupling the RF modulated video signals and the unmodulated digital signals received at each said signal port to each other signal port, without port-to-port signal isolation; and connecting each appliance to its associated coaxial cable through an associated one of a plurality of signal frequency filters, including a digital signal frequency filter having a frequency bandpass suitable to pass therethrough the unmodulated digital signals at a selected signal bit speed, and including an RF modulated video signal filter having a frequency bandpass suitable to bi-directionally pass therethrough the RF modulated broadcast television signals and the RF modulated video signals, each said filter being connected at a first terminal thereof to the associated appliance and connected at a second terminal thereof to the associated coaxial cable, each one of said filters providing a substantially equal filter characteristic impedance to bandpass signals propagating bi-directionally through the multi-drop signal distribution apparatus and between the associated appliance and the coaxial cable.

2. The method of claim 1, wherein the passband of said RF modulated video signal filter is at a higher frequency spectrum than the passband of said digital signal filter.

3. The method of claim 2, wherein the frequency passband of said digital signal filter is substantially from zero hertz to 2.5 megahertz and the frequency passband of said RF video signal filter is greater than five megahertz.

4. The method of claim 1, wherein the step of connecting further includes the steps of:

identifying each digital signal appliance and each associated digital signal frequency filter; and inserting a filter impedance matching network intermediate to the connection between each digital signal appliance and said first terminal of said associated digital signal frequency filter, said filter impedance matching network providing a terminating impedance value at said first terminal which approximates the cable characteristic impedance provided to said second terminal, thereby providing substantially equal filter characteristic impedance to unmodulated digital signals exchanged at a signal bit speed, bi-directionally, through said digital signal frequency filter.

5. The method of claim 4, wherein said step of inserting further includes the step of:

providing said impedance matching network as a series resistor functionally connected at a first side thereof to said first terminal of said digital signal filter and connected at a second side thereof to the digital signal appliance, said series resistor being further connected at said second side through a shunt resistor to the low voltage potential reference of the digital signal appliance.

6. The method of claim 5, wherein said shunt resistor has a shunt impedance value which is substantially equal to the value of the cable characteristic impedance, and wherein said series resistor has a series impedance value which is in the range of from one third to two thirds of said shunt impedance value.

7. The method of claim 6, wherein said series impedance value is selected at a value within said range to minimize digital signal interference with the RF modulated video signals.

8. The method of claim 4, wherein said signal bit speed of the unmodulated digital signal is a minimum of substantially 1.0 Mbps.

9. The method of claim 1, wherein said digital signal frequency filter is at least a third order filter.

10. The method of claim 1, wherein said digital signal frequency filter is at least a fifth order filter.

11. The method of claim 1, wherein said step of installing further includes the step of blocking the RF modulated video signals and unmodulated digital signals received at said output signal ports from being coupled to said source input.

12. The method of claim 1, wherein said step of installing includes inserting, at each said output port, an associated distribution apparatus impedance matching network connected in series between the associated said output port and said source input, for providing a terminating impedance value at each said output port which approximates the cable characteristic impedance.

13. A method for bi-directionally distributing radio frequency (RF) modulated broadcast television signals from a broadcast signal source to networked appliances making up a complete network comprised of single conductor coaxial cables interconnected through a distribution unit, and connected to the source through a plurality of single conductor coaxial cables, while simultaneously bi-directionally distributing signals exchanged between the networked appliances over the same coaxial cables throughout the complete network, the exchanged signals including RF modulated video signals from RF modulated video signal appliances and unmodulated digital from digital signal appliances, the coaxial cable having a cable characteristic impedance, the method comprising:

installing a device which comprises the distribution unit for bi-directionally transmitting and receiving RF modulated video signals on a plurality of interconnected coaxial cables, the distribution unit comprising a multi-drop signal distribution apparatus having a source input for receiving the RF modulated broadcast television signals from the broadcast source and having a plurality of signal ports, each signal port receiving the RF modulated video signals and unmodulated digital signals from an associated one of the plurality of coaxial cables;

coupling the RF broadcast signals within said signal distribution apparatus, from said source input to each said signal port;

coupling the RF modulated video signals and the unmodulated digital signals received at each said signal port to each other signal port, without port-to-port signal isolation;

connecting each appliance to its associated coaxial cable through one of a plurality of signal frequency filters, each said filter being connected at a first terminal thereof to the associated appliance and connected at a second terminal thereof to the associated coaxial cable, said plurality of signal filters including digital signal frequency filters having a frequency bandpass substantially from zero hertz to 2.5 Megahertz, suitable to bi-directionally pass therethrough unmodulated digital signals between a digital signal appliance and the coaxial, said plurality of signal filters further including RF modulated video signal filters having a frequency bandpass greater than five megahertz, suitable to bi-directionally pass therethrough the RF modulated broadcast television signals and the RF modulated video signals between an RF modulated video signal appliance and the coaxial cable, each one of said video signal filters providing a substantially equal filter characteristic impedance to bandpass signals propagating bi-directionally therethrough between the associated appliance and the coaxial cable; and inserting an impedance matching network between the signal input and output (I/O) ports of each digital signal appliance and said first terminal of said associated digital signal frequency filter, said impedance matching network providing a terminating impedance value at said first terminal which approximates the cable characteristic impedance provided to said second terminal, thereby providing said bi-directional exchange of unmodulated digital signals at a minimum signal bit speed of substantially with minimum digital signal interference of the RF modulated video signals.

* * * * *

UNITED STATES PATENT AND TRADEMARK OFFICE

CERTIFICATE OF CORRECTION

PATENT NO. : 6,481,013 B1

DATED : November 12, 2002

INVENTOR(S) : John M. Dinwiddie, William Burrell Nunnery and Jack S. Chorpenning It is certified that error appears in the above-identified patent and that said Letters Patent is hereby corrected as shown below:

<u>Column 4,</u>
Line 34, after "utility" delete "action" and insert -- function --

Signed and Sealed this

Eighth Day of April, 2003

JAMES E. ROGAN

*Director of the United States Patent and Trademark Office*